United States Patent
Nakamura

(10) Patent No.: US 9,076,225 B2
(45) Date of Patent: Jul. 7, 2015

(54) IMAGE PROCESSING DEVICE, AN IMAGE PROCESSING METHOD AND A PROGRAM TO BE USED TO IMPLEMENT THE IMAGE PROCESSING

(71) Applicant: NIDEC SANKYO CORPORATION, Suwa-gun, Nagano (JP)

(72) Inventor: Hiroshi Nakamura, Nagano (JP)

(73) Assignee: NIDEC SANKYO CORPORATION (JP)

( * ) Notice: Subject to any disclaimer, the term of this patent is extended or adjusted under 35 U.S.C. 154(b) by 0 days.

(21) Appl. No.: 14/015,181

(22) Filed: Aug. 30, 2013

(65) Prior Publication Data

US 2014/0086473 A1   Mar. 27, 2014

(30) Foreign Application Priority Data

Sep. 26, 2012   (JP) ................. 2012-212208

(51) Int. Cl.
| | |
|---|---|
| *G06K 9/00* | (2006.01) |
| *G06K 9/40* | (2006.01) |
| *G06T 5/20* | (2006.01) |
| *G06T 5/00* | (2006.01) |
| *G06K 9/38* | (2006.01) |

(52) U.S. Cl.
CPC . *G06T 5/20* (2013.01); *G06T 5/009* (2013.01); *G06T 2207/10008* (2013.01); *G06T 2207/30176* (2013.01); *G06K 9/38* (2013.01); *G06K 2209/015* (2013.01)

(58) Field of Classification Search
None
See application file for complete search history.

(56) References Cited

U.S. PATENT DOCUMENTS

| | | | | |
|---|---|---|---|---|
| 5,818,978 | A * | 10/1998 | Al-Hussein | 382/296 |
| 6,055,007 | A * | 4/2000 | Fujiwara et al. | 347/131 |
| 7,426,291 | B2 * | 9/2008 | Okamura | 382/137 |

FOREIGN PATENT DOCUMENTS

JP   2000331118   11/2000

* cited by examiner

*Primary Examiner* — Daniel Mariam
(74) *Attorney, Agent, or Firm* — Cantor Colburn LLP

(57) ABSTRACT

An image processing device may include an image scanning unit; an image memory; a sample area designating unit; a binarization unit for implementing a filtering process on a scanned multi-valued image, to produce the compensated image data and for binarizing the compensated image data; a correlation operation unit for acquiring each of the correlations between the binary image data and the scanned multi-valued image data; and an optimal binarization information selecting unit for selecting the optimal parameter value or binary image data based on the correlations. The binarization unit may include a parameter value setting section, a filtering process section, and a binarization process section for binarizing each of the compensated image data based on a predetermined binary threshold.

8 Claims, 18 Drawing Sheets

$$\begin{pmatrix} -1 & -1 & -1 & -1 & -1 \\ -1 & -2 & -2 & -2 & -1 \\ -1 & -2 & \alpha + p & -2 & -1 \\ -1 & -2 & -2 & -2 & -1 \\ -1 & -1 & -1 & -1 & -1 \end{pmatrix}$$

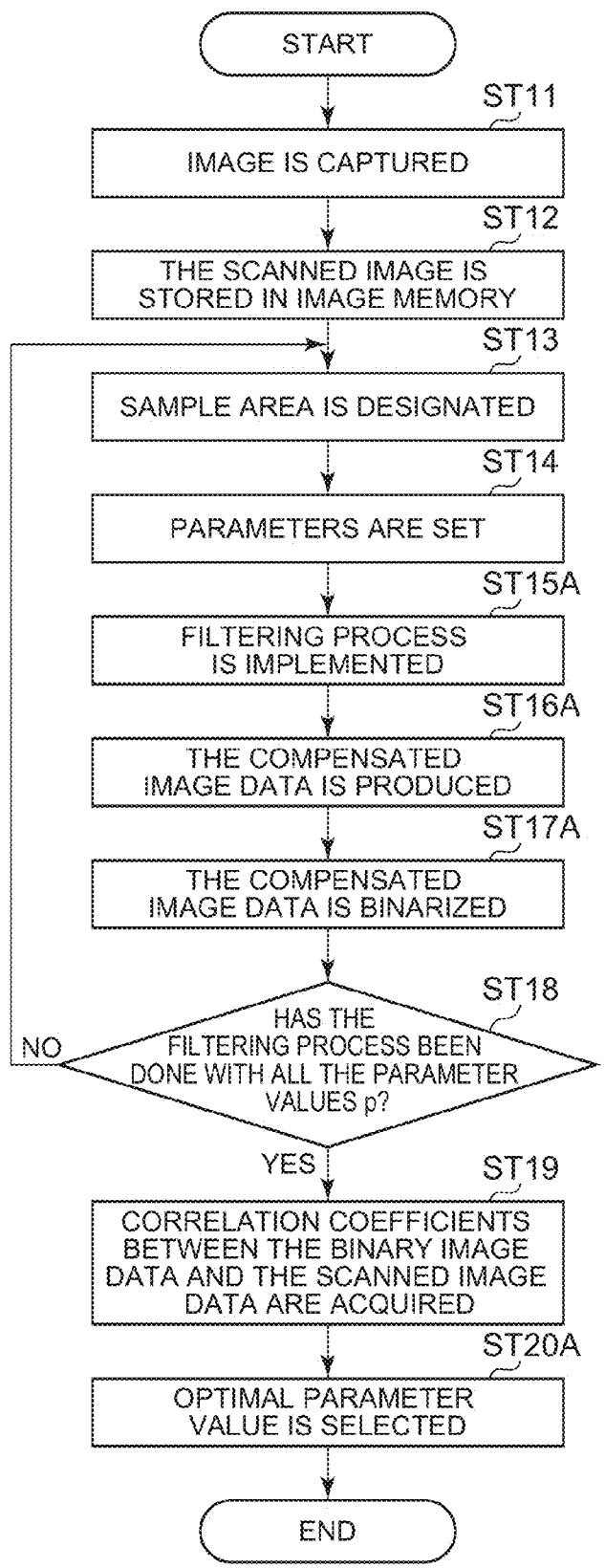

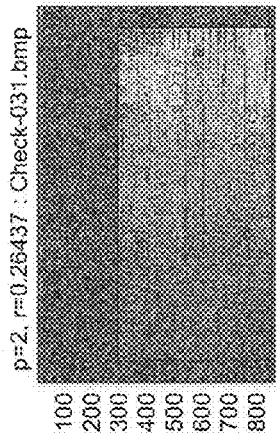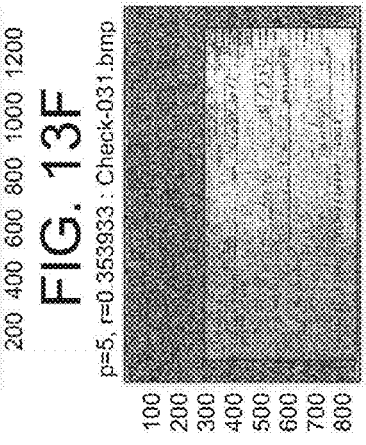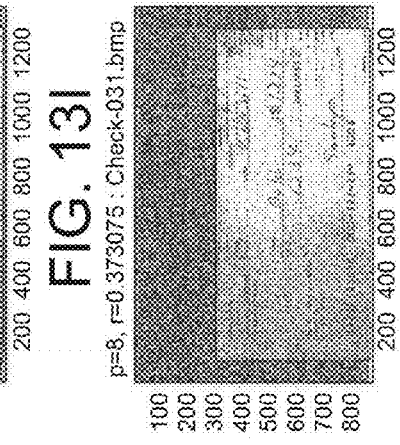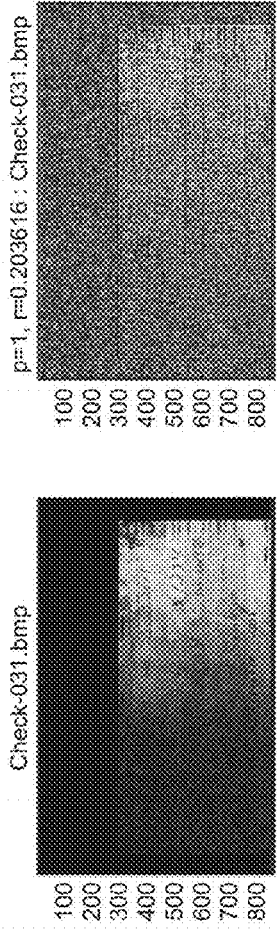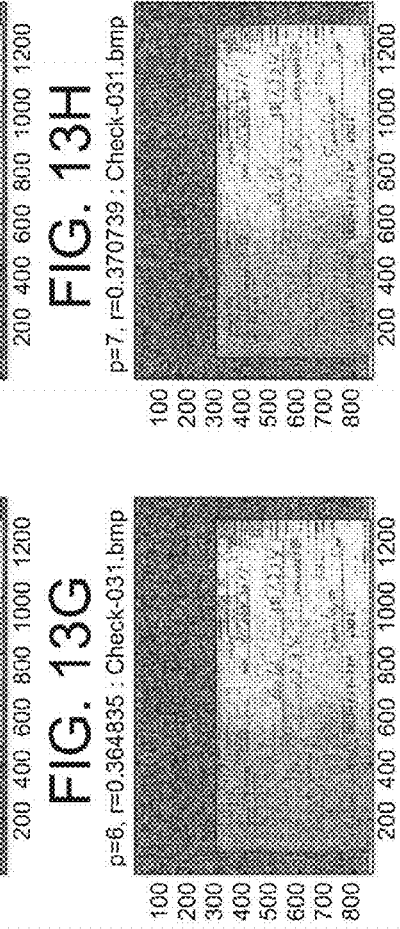

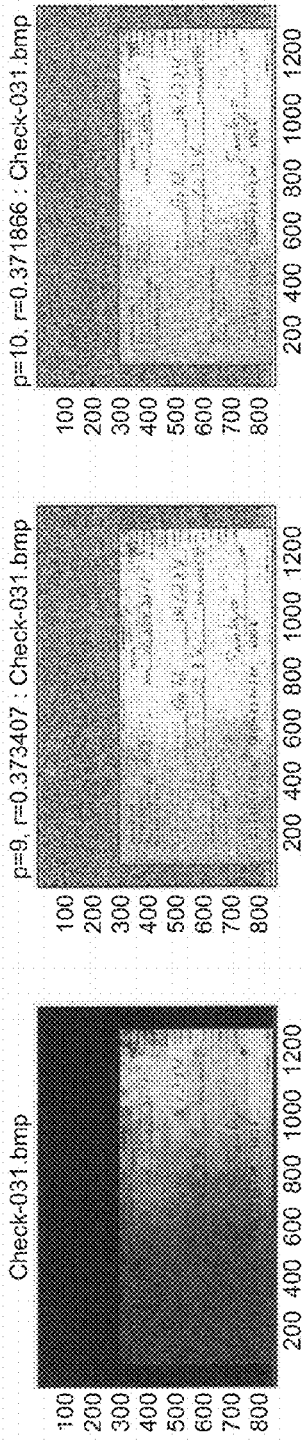
FIG. 14A Check-031.bmp
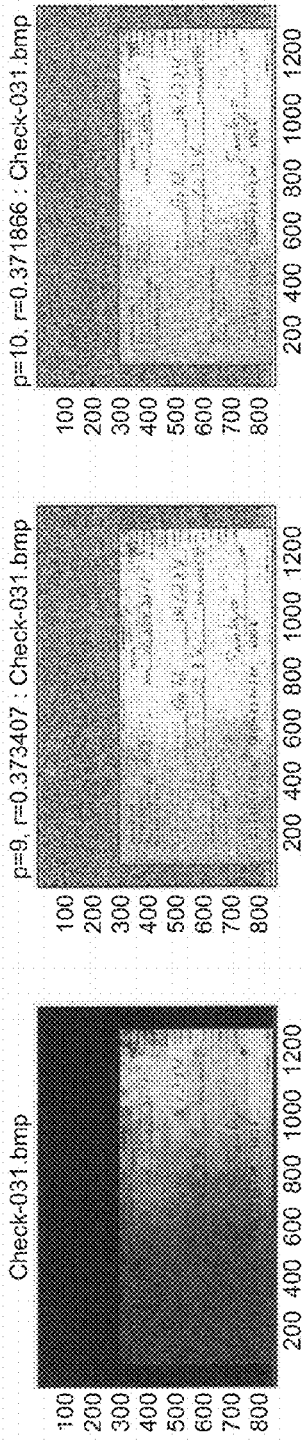
FIG. 14B p=9, r=0.373407 : Check-031.bmp
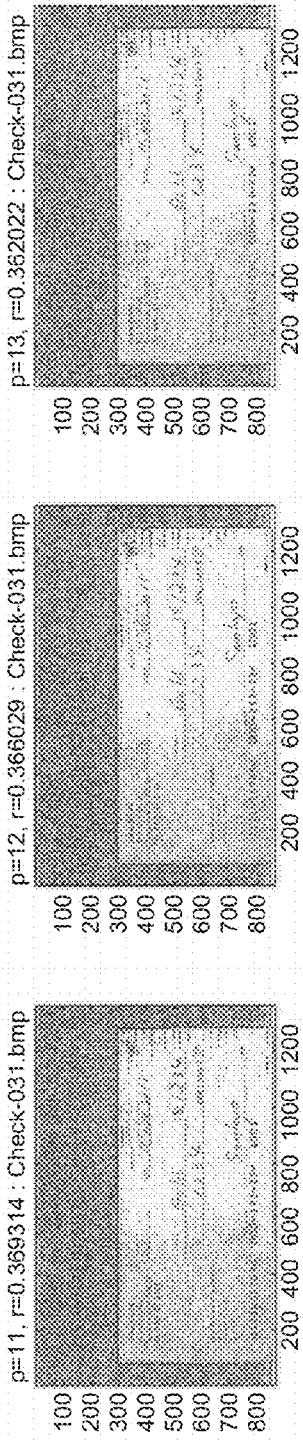
FIG. 14C p=10, r=0.371866 : Check-031.bmp
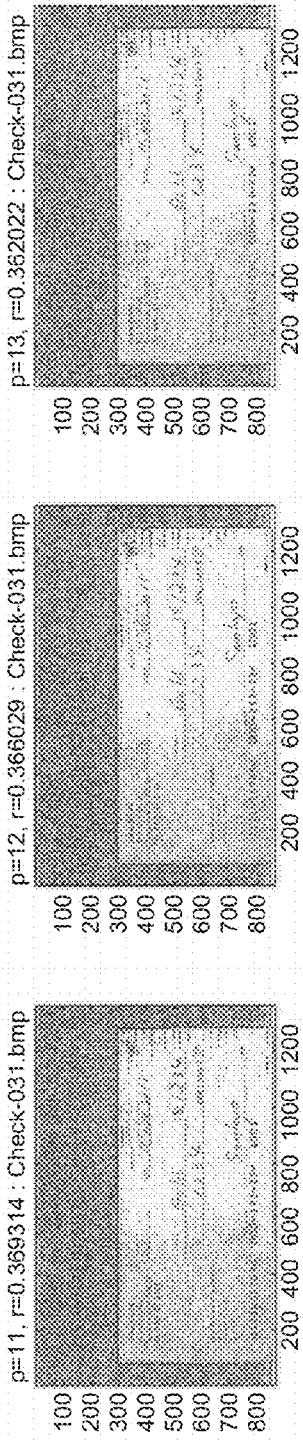
FIG. 14D p=11, r=0.369314 : Check-031.bmp
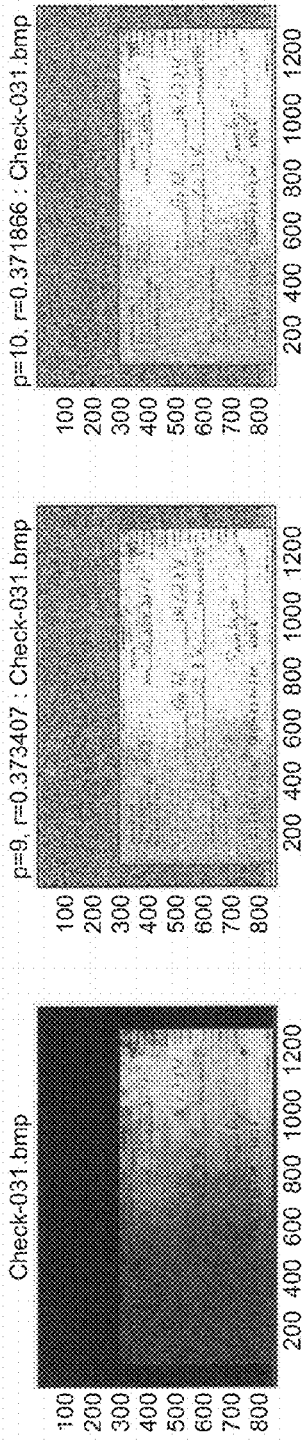
FIG. 14E p=12, r=0.366029 : Check-031.bmp
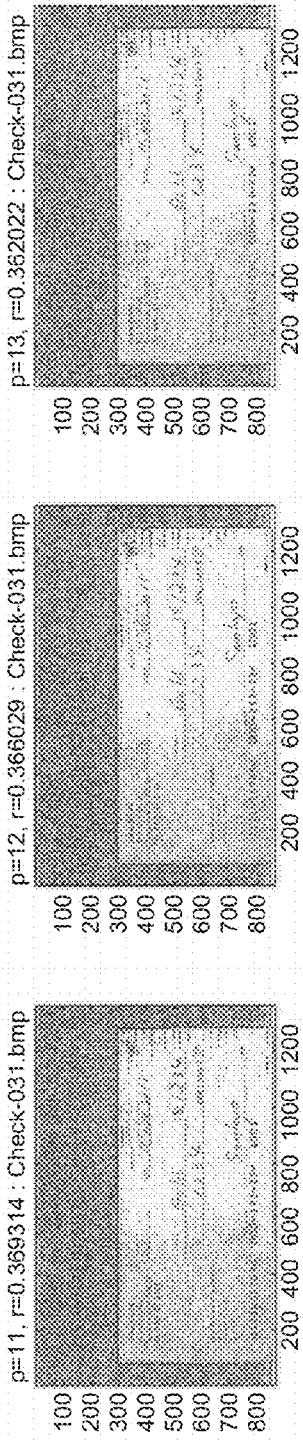
FIG. 14F p=13, r=0.362022 : Check-031.bmp
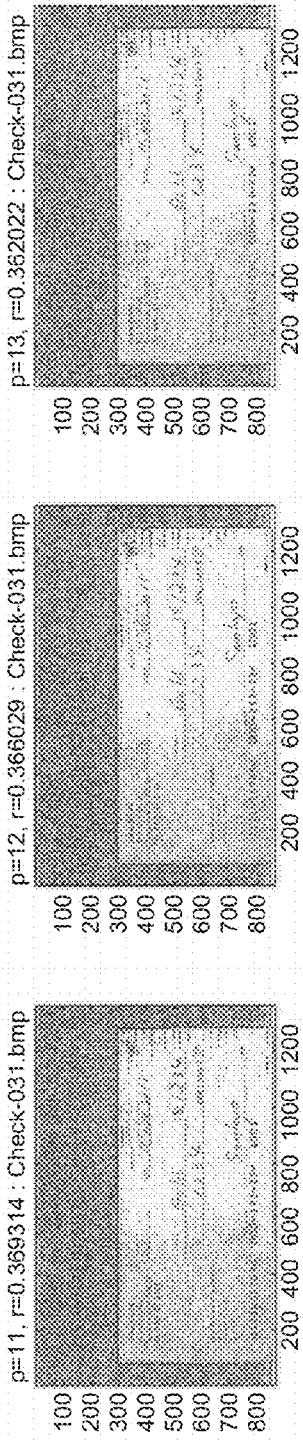
FIG. 14G p=14, r=0.357933 : Check-031.bmp
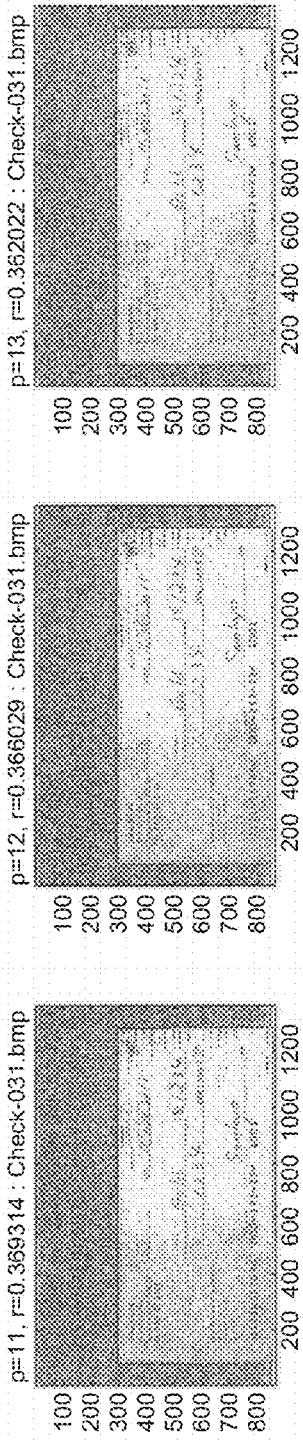
FIG. 14H p=15, r=0.353596 : Check-031.bmp
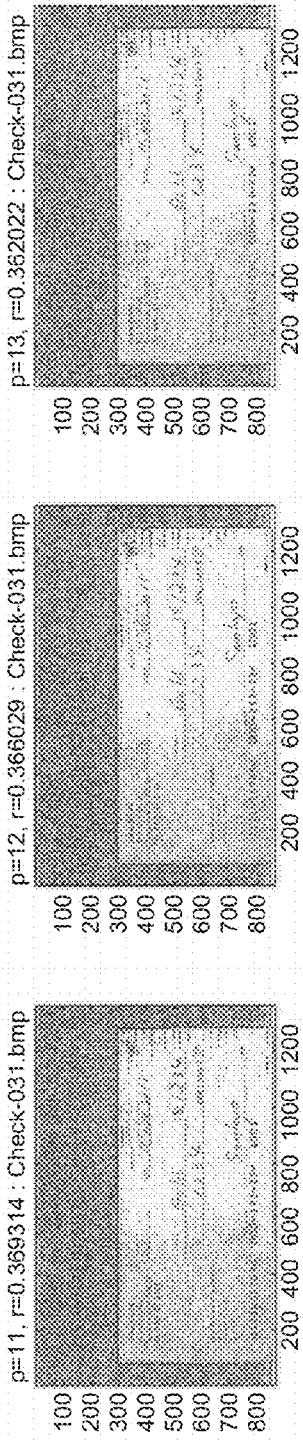
FIG. 14I p=16, r=0.349296 : Check-031.bmp

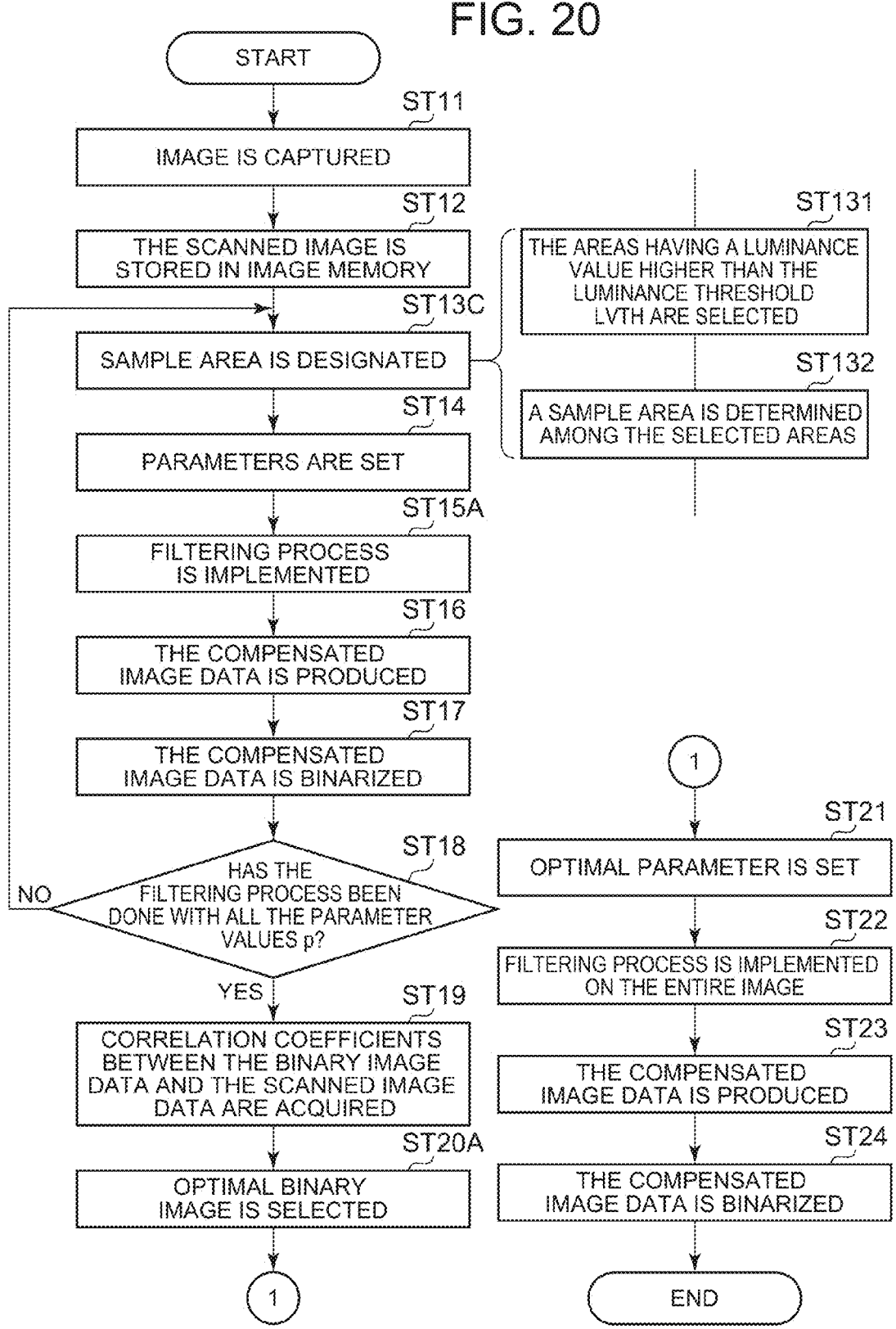

IMAGE PROCESSING DEVICE, AN IMAGE PROCESSING METHOD AND A PROGRAM TO BE USED TO IMPLEMENT THE IMAGE PROCESSING

CROSS REFERENCE TO RELATED APPLICATIONS

The present invention claims priority under 35 U.S.C. §119 to Japanese Application No. 2012-212208 filed Sep. 26, 2013, the entire content of which is incorporated herein by reference.

FIELD OF THE INVENTION

The present invention relates to an image processing device for producing a binary image from a scanned multi-valued image (gray image), its image processing method and a program [to be used to implement the image processing].

BACKGROUND OF TECHNOLOGY

Conventionally, various image processing devices have been proposed for reading a character line written on a surface of a medium such as a check and for acquiring a digital image.

This image is mostly used by an application which recognizes various information contained in the image; however, the role of an image scanner (image processing device) is becoming more important from the point of providing the images on which a recognition process can be implemented.

In an application which implements various recognition processes taking the image scanned by the image scanner as an input, recognition is made based on the binary image.

Patent Reference 1 discloses a technique to produce a binary image suitable for the purpose of the application from a general grayscale image.

In this technique, after a general binarization, noise that can easily be generated in the Gray-to-Gray area is removed by an additional process utilizing the connected components between the black pixels and the white pixels.

However, this technique may not be able to implement the process fully when there is great inhomogeneous illumination in areas of the image.

Then, responding to the above problem, the technique disclosed in the non-patent Reference 1 discriminates the "objects to be recognized" from the background even if there is inhomogeneous illumination.

PRIOR ART

Patent Reference

[Patent Reference 1] Japanese Unexamined Patent Application: 2000-331118 Publication Non-patent Reference

[Non-patent reference 1] Kindratenko and others: Binarization of Inhomogeneously Illuminated Images, ICIAP' 95

SUMMARY OF INVENTION

Problems of Prior Art and Objectives of the Invention

However, in the technique disclosed in the non-patent Reference 1, a correlation operation is repeated over the entire image by changing the filter parameter in order to obtain the optimal binarization result, requiring quite large amount of operation workload which in turn requires a lot of time in processing.

The present invention, therefore, is devised to provide an image processing device capable of acquiring a high quality binary image with relatively less operation workload, its image processing method and a program to be used to implement the image processing.

Means to Obtain Objectives

The first aspect of the present invention is of an image processing device for producing a binary image from a scanned multi-valued gray image, comprising a image scanning unit that scans the image as said multi-valued image, an image memory that stores the scanned multi-valued image captured by the image scanning unit, a sample area designating unit that designates a sample area in the scanned multi-valued image stored in the memory, a binarization unit that implements a filtering process on the scanned multi-valued image over which the sample area is designated, to produce the compensated image data and binarizes the compensated image, a correlation operation unit that acquires the correlations between the binary image data acquired at the binarization unit and the scanned multi-valued image data, and an optimal binarization information selecting unit that selects the optimal parameter value or binary image data, based on the correlations; wherein the binarization unit includes a parameter-setting section that sets multiple parameter values by adding the variable additaments to the coefficient for a target pixel in the filter, a filtering section that creates a matrix containing the target pixel in the center and its neighboring pixels and implements a filtering process on the scanned multi-valued image data by using the filter in which the parameter values are set to produce the compensated image data corresponding to the parameter values, and a binarization section that binarizes each of the compensated image data based on the predetermined binary threshold.

With this, the calculation time is shortened, and the correlation operation is implemented focusing on the sample area, which is targeted and designated in advance, to acquire the optimal binary image for this area.

It is preferred that the filtering section in the binarization unit implement a filtering on the scanned multi-valued image data within the sample area to produce the compensated image data corresponding to the parameter values.

It is preferred that the optimal binarization data selecting unit select the optimal parameter value based on the correlations and notify it to the parameter-setting section of the binarization unit, the filtering section of the binarization unit implement a filtering on the entire scanned multi-valued image by using the notified parameter, and the binarization section binarize the entire compensated image data by the predetermined binary thresholds.

It is preferred that the filtering process section of the binarization unit implement a filtering process on the scanned multi-valued image data including the sample area and produce the compensated image data corresponding to the parameter values.

It is preferred that the optimal binarization data selecting unit select the optimal binarization image data based on the aforementioned correlations and notify it to the binarization processing section of the binarization unit, and the binarization processing section of the binarization unit binarize the entire compensated image data based on the predetermined binary thresholds and output it as binary images.

It is preferred that the sample area designating unit compare the luminance values indicated by the pixel values of the scanned multi-valued image in the image memory with the luminance threshold, which is set in advance, to designate a sample area from the areas having a luminance value higher than the luminance threshold.

It is preferred that the medium to be scanned by the image scanning unit contain multiple writing areas, and the sample area designating unit select the writing areas having luminance values higher than the luminance threshold from the aforementioned multiple writing areas and designate a sample area from the selected writing areas.

The second aspect of the present invention is of an image processing method for producing a binary image from a scanned multi-valued gray image, comprising an image scanning step in which the image is scanned as the multi-valued image, an image storing step in which the scanned multi-valued image captured by the image scanning unit is stored in an image memory, a sample area designating step in which a sample area is designated in the scanned multi-valued image stored in the memory, a binarization step in which a filtering process is implemented on the scanned multi-valued image over which the sample area is designated, to produce the compensated image data and binarize the compensated image data, a correlation operation step in which the correlations between the binary image data acquired at the binarization unit and the scanned multi-valued image data are acquired, and an optimal binarization data selecting step in which the optimal parameter value or binary image data is selected, based on the correlations; wherein the binarization step includes a parameter-setting step for setting multiple parameter values which are calculated by adding the variable additaments to the coefficient for a target pixel in a filter, a filtering step for creating a matrix that contains the target pixel in the center and its neighboring pixels and implementing a filtering process on the scanned multi-valued image data using the filter in which the parameter values are set, to produce the compensated image data corresponding to the parameter values, and a binarization step for binarizing each of the compensated image data [values] based on the predetermined binary threshold.

The third aspect of the present invention is of a program for a computer to implement the image processing to produce a binary image from the scanned multi-valued gray image, comprising a sample area designating process in which a sample area is designated in the image scanned as a multi-valued image and stored in the image memory, a binarization process in which a filtering process is implemented on the scanned multi-valued image over which the sample area is designated, to produce the compensated image data, and the compensated image data is binarized, a correlation operation process in which the correlations between the binarization image data acquired at the binarization unit and the scanned multi-valued image data are acquired, and an optimal binarization data selection process in which the optimal parameter value or binary image data is selected, based on the correlations; wherein the binarization process includes a parameter-setting process in which multiple parameter values are calculated by adding the variable additaments to the coefficient for a target pixel in a filter, a filtering process in which a matrix containing the target pixel in the center and its neighboring pixels is created, and a filtering process is implemented on the scanned multi-valued image data using the filter in which the parameter values is set, to produce the compensated image data corresponding to the parameter values, and a binarization process in which each of the compensated image data is binarized based on the predetermined binary threshold.

Effects of the Invention

The present invention can acquire a high quality binary image through relatively less operation workload.

BRIEF DESCRIPTION OF THE DRAWINGS

FIG. 12 is a flowchart to explain the operation of the image processing device of the second embodiment.

FIGS. 13A-13I show the first figure of the binary images of the check shown in FIG. 2 which is imaged (by the image scanner), after designating a sample area, a filtering process and a binarization process, which are the features of this embodiment, are implemented.

FIGS. 14A-14I show the second figure of the binary images of the check shown in FIG. 2 imaged (by the image scanner), after designating a sample area, a filtering process and a binarization process, which are the features of this embodiment, are implemented.

FIG. 20 is a flowchart to explain the operation of the image processing device of the fourth embodiment.

DETAILED DESCRIPTION OF THE INVENTION

The embodiments of the present invention are described hereinafter, corresponding to the drawings.

<First Embodiment>

Figure 1:
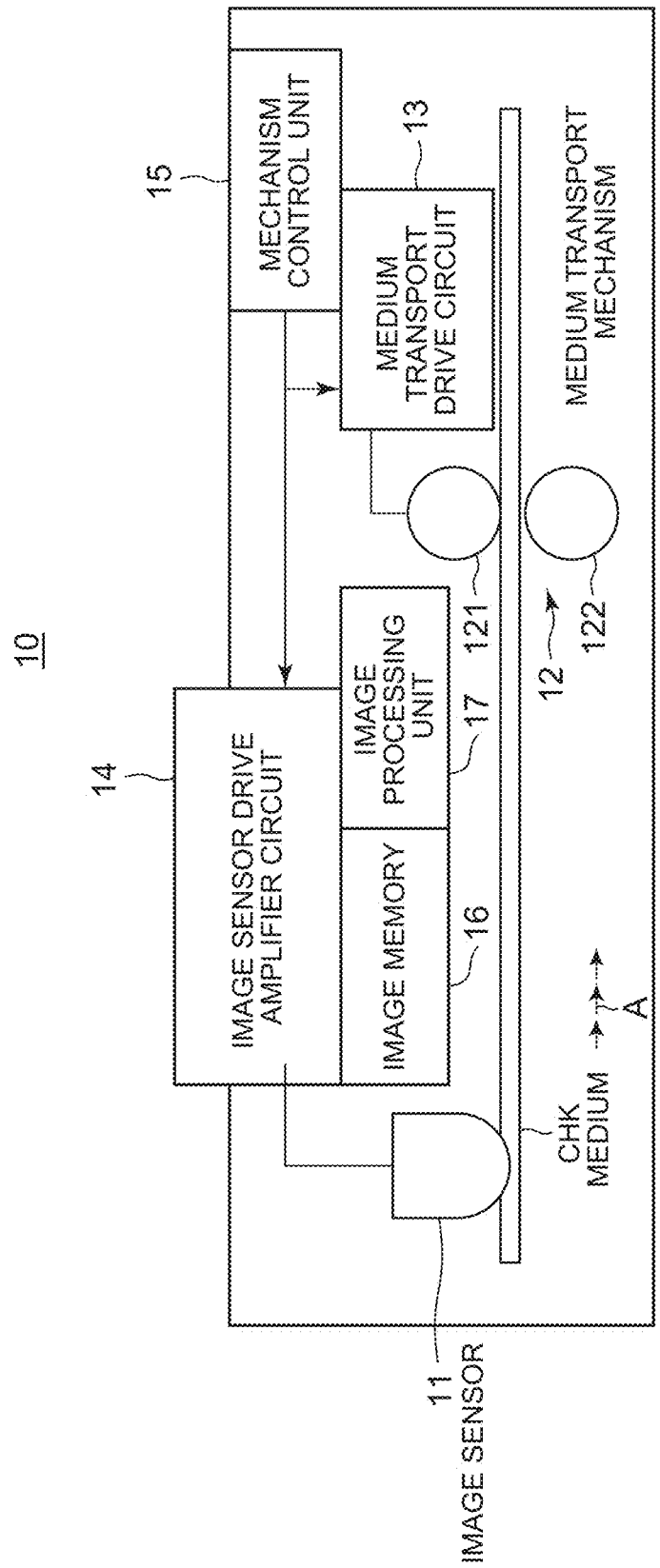
FIG. 1 is a diagram showing an example of the configuration of an image processing device of an embodiment of the present invention.

FIG. 1 is a diagram showing an example of the configuration of an image processing device of the embodiment of the present invention.

An image processing device 10 of this embodiment is configured by an image sensor 11 as an image scanning unit, a medium transporting unit 12, a medium transporting drive circuit 13, an image sensor drive amplifier circuit 14, a mechanism control unit 15, an image memory 16 and an image processing unit 17.

This embodiment uses the image processing device 10 as an example of a check reader equipped with an image scanning function.

[Example of the Configuration of a Check as a Medium to be Read]

Figure 2:
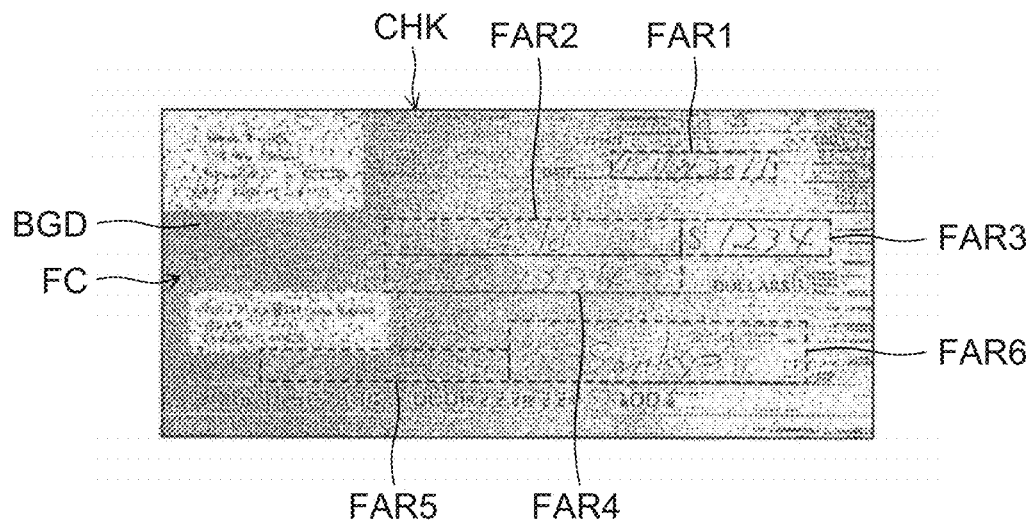
FIG. 2 is a diagram showing an example of a check as a medium to be scanned by the image processing device of this embodiment.

FIG. 2 shows a check CHK as an example of a medium to be scanned by the image processing device 10 of this embodiment.

On the front face FC of the check CHK, blank areas FAR to write an issue date, a payee, an amount, a settlement amount, a purpose (such as rent, utility, etc.), and a signature are arranged at different locations with a gray-colored base background BGD.

In the example of FIG. 2, an issue date is written in the area FAR1, a payee is written in the area FAR2, an amount is written in the area FAR3, a settlement amount in the area FAR4, the purpose of payment in the area FAR 5, and a signature in the area FAR6.

FIG. 2 is one example of many kinds of checks CHK; the background BGD is primarily in gray, and at least the areas FAR and their peripheries are primarily whiter and brighter than the background BGD.

The more detailed configuration of the image processing device 10 equipped with the function of scanning the image of such a check CHK and the image processing function are described hereinafter.

In the image processing device 10, the medium transporting unit 12, the medium transporting drive circuit 13, the image sensor drive amplifier circuit 14, etc. are basically operated by the mechanism control unit 15.

In the image processing device 10 of this embodiment, an image sensor 11 is arranged on the medium transporting unit (transport pathway) for scanning the image of the front face FC of the check CHK which is a medium to be scanned.

The image sensor 11 is configured by a close-contact type 1D image pickup device, for example, and driven by the image sensor drive amplifier circuit 14 under the control of the mechanism control section 15.

Although the close-contact type 1D image pickup device is adopted as the image sensor 11 for the purpose of minimizing the device, a 2D area sensor may be adopted as the image sensor 11 to scan the entire surface of the front face FC of the check CHK which is a medium to be scanned. The imaging device of the image sensor is formed from a CDC or a CMO sensor, for example.

The image sensor 11 is arranged on the top side of the transporting face in the example of FIG. 1; however, it may be arranged at the top or the bottom or on both sides of the transporting surface.

Further, a printing block may be arranged at the last step in the medium transporting unit 12 in order to provide a function of printing predetermined items during the process on the check.

A check CHK as a medium to be scanned is inserted to the medium transporting unit 12 such that the front face FC thereof is opposed to a sensor head (a reading unit) of the image sensor 11.

In the medium transporting unit 12, rollers 121 and 122 are arranged as a medium transporting mechanism driven by the medium transporting drive circuit 13, and the check CHK, which is a medium to be read, is transported in the direction indicated by the arrow A in the figure, following the drive of the rollers 121 and 122.

As the check CHK inserted at the medium transporting unit 12 passes the sensor head of the image sensor 11, its digitized scanned multi-valued image (grayscale image) is stored (recorded) in the image memory 16.

Thus, the image memory 16 stores the original image OIM (X) which is the multi-valued (grayscale) image captured by the image sensor 11 as the image scanning unit.

The original image OIM(X) stored in the image memory 16 is formed such that multiple pixels are arranged in a matrix, and each pixel has its own pixel value (luminance value). Each luminance value can be expressed by any number from 0 to 255 by the 8 bit expression; the closer to black the image is, the smaller the pixel value is; on the other hand, the closer to white the image is, the larger the pixel value is.

Each pixel value of the original image OIM(X) is multiplied by the corresponding coefficient in the Laplacian filter kernel at the filtering process section of the image processing unit 17. Through this, the original image OIM (X) receives a Laplacian filtering (the operation process).

Note that a Laplacian filter is a kind of second derivative filter used for edge detection and image sharpening. In other words, a Laplacian filter calculates space secondary derivative to detect the outline and extracts the portion that shows the extremely large amount of change in the luminance difference.

Figure 3:
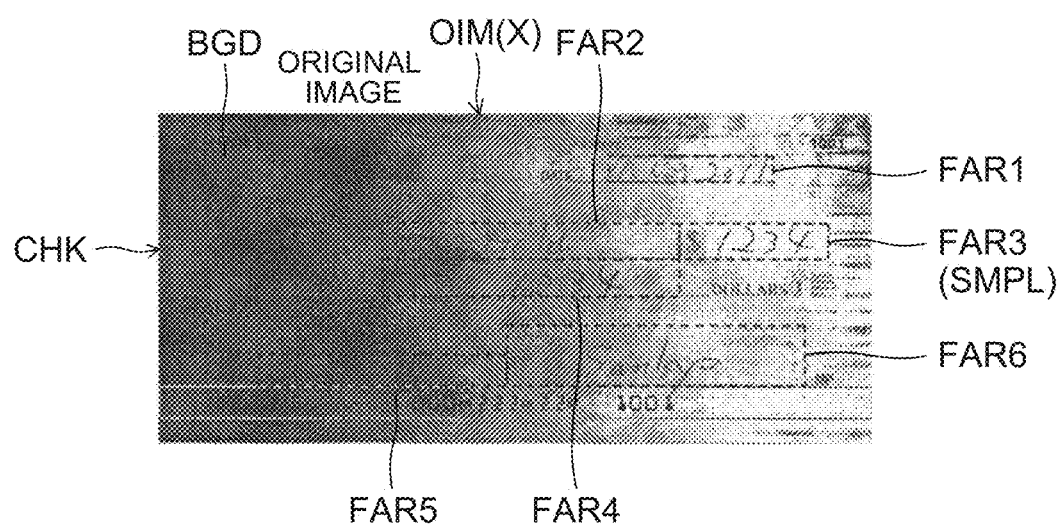
FIG. 3 is a diagram showing an example of the original image of the check, which is scanned by an image sensor and stored in an image memory in this embodiment.

FIG. 3 shows an example of the original image OIM(X) of the check CHK which is captured by the image sensor and stored in the image memory in this embodiment.

In the original image OIM (X) shown in FIG. 3, due to the imaging conditions such as the intensity of illumination and the direction of illumination, most of the background BGD, the left side of the check CHK in the figure in particular in which the writing area FAR5 of payment purpose (memo line) is arranged, is so dark that characters can hardly be identified.

In the original image OIM(X) shown in FIG. 3, the writing area of payee FRA2, the writing area of the settlement amount FAR4 and the writing area of signature FAR6 in the center portion of the check CHK are readable, but still dark meaning some characters are not easily read.

On the other hand, in the original image OIM(X) shown in FIG. 3, the writing area of date FAR1 and the writing area of amount FAR3 arranged on the right side of the check CHK in the figure are relatively clearly imaged in a high reproduction quality. Particularly, the writing area of amount FAR3 is imaged clearly readable in a high reproduction quality.

The image processing unit 17 selectively designates a sample area, on which the image processing is implemented, in the original image (the scanned multi-valued image (grayscale image)) stored in the image memory. More specifically described, a sample area on which the image processing is implemented is selected and designated in the original image. The image processing here includes a Laplacian filtering (an operation process), one of the convolution filtering operations.

In the first embodiment, the image processing unit 17 implements the filtering process and a binarization process on the designated sample area.

In the binarization process, the image processing unit 17 sets multiple parameter values PT by adding the variable additaments p to the coefficient α for the target pixel in the Laplacian filter, implements a filtering process on the sample area using each parameter which has been set, and then implements a binarization compensation process on the multi-valued image of the sample area to binarize it based on the predetermined binary thresholds.

The image processing unit 17 calculates the correlation coefficient R between each of the binarized, compensated image data of the sample area and [the image data of] the sample area in the original image OIM(X) and selects the parameter value which was used to produce the compensated image data having the maximum (largest) correlation coefficient R as the optimal parameter value PT.

Then, the image processing unit 17 implements the Laplacian filtering and the binarization process on the entire original image OIM (X) using the selected optimal parameter value PT and outputs the entire compensated image data to the image display unit and the image recognition unit.

In the above manner, the image data stored in the image memory 16 is processed with the above-described filtering process and the binarization compensation process, and the optimal binary image data is extracted. Note that the extracted optimal binary image data can be referred to as the optimal binary image at the image display or in the character recognition process.

The character recognition process is implemented by a micro processor built in a check reader, for example; however, the digital image data may be forwarded to a host control device to implement the character recognition process.

A magnetic head can be provided on the medium transporting unit 12, of course, to read MICR characters printed on the check surface.

Next, an example of the configuration of the image processing unit 17 of the first embodiment is described in detail.

Figure 4:
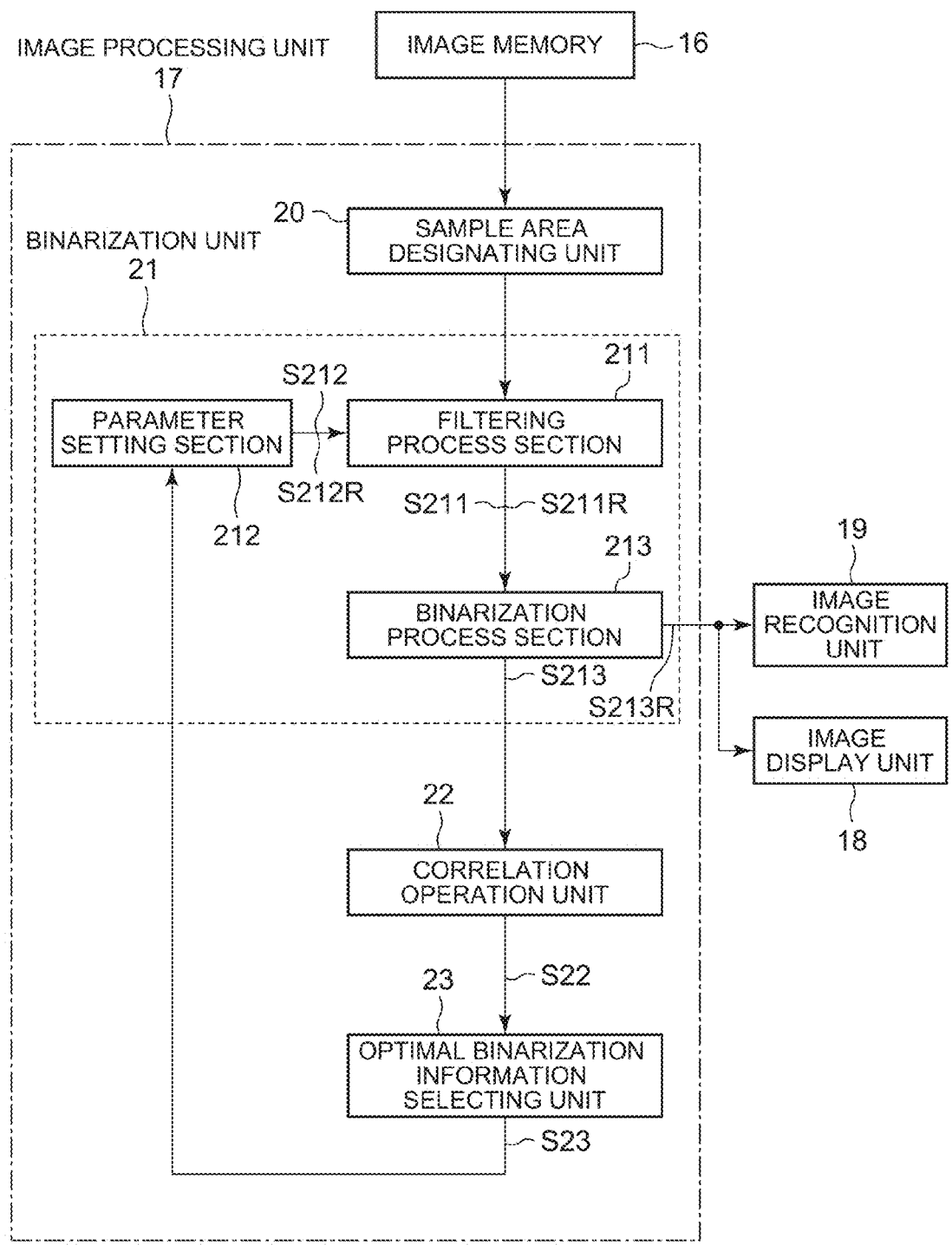
FIG. 4 is a block diagram showing an example of the configuration of the image processing unit of the first embodiment.

FIG. 4 is a block diagram showing an example of the configuration of the image processing unit of the first embodiment.

To the image processing unit 17 shown in FIG. 4, an image display unit 18 such as an LCD and an image recognition unit 19 are connected.

The image processing unit 17 shown in FIG. 4 is configured by a sample area designating unit 20, a binarization unit 21, a correlation operation unit 22 and an optimal binary information selecting unit 23.

The sample area designating unit 20 selectively designates a sample area in the original image OIM(X) (the read multi-valued gray image) stored in the image memory 16, on which the image processing including a Laplacian filtering process (the operation process), one the of the convolution filtering operations, is implemented.

When the target sample area is not changed depending on the medium, a fixed area may be set.

In the first embodiment, the writing areas FAR1 through 6 in a check CHK, which is a medium to be scanned, do not change basically; therefore, the writing area of amount FAR3 may be set as a sample area SMPL.

The scanned multi-valued (gray) image data of the sample area SMPL, which is designated by the sample area designating unit 20, is supplied to the binarization unit 21.

Note that if the sample area SMPL is one that changes depending on the medium, a structure to automatically self-judge the area may be given.

The binarization unit 21 has a Laplacian filtering process section 211, a parameter setting section 212 and a binarization processing section 213.

The Laplacian filtering process section 211 implements a Laplacian filtering on the image of the sample area SMPL designated by the sample area designating unit 20, using each parameter value PT set at the parameter setting section 212 and produces the compensated image data of the sample area SMPL corresponding to the parameter values and outputs it to the binarization processing section 213.

The Laplacian filtering process (the operation process) is one of the 2D convolution filtering processes using a 2D convolution matrix, which is an operation process using a kernel matrix.

Figures 5, 6A, 6B:
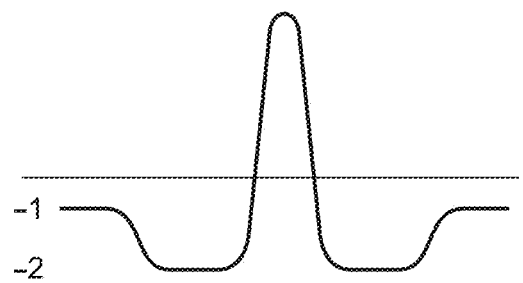
FIG. 5 is a diagram showing a 5×5 pixel matrix.
FIGS. 6A and 6B are diagrams showing an example of the kernel and filter characteristic corresponding to the pixel matrix of FIG. 5.

FIG. 5 shows a 5×5 pixel matrix.

FIG. 6 shows one example of the kernel and the filter property corresponding to the pixel matrix of FIG. 5.

The pixel matrix shown in FIG. 5 is configured such that 25 pixels PX which are the pixels PX00 to PX04, Px10 to PX14, PX20 to PX24, PX30 to PX34 and PX40 to PX44, are arranged in a matrix.

In other words, the pixel matrix MPX is formed by the pixel PX22 in the center of the matrix selected as a target pixel TPX and the neighboring pixels PX00 to PX04, PX10 to PX14, PX20, PX21, PX23, PX24, PX30 to PX34, and PX40 to PX44.

Corresponding to each pixel in the pixel matrix having the target pixel TPX in the center, a certain value according to the purpose of the filtering process, such as "−1", "−2", "0", etc., is set in the kernel shown in FIG. 6.

In the example shown in FIG. 6, the target pixel is set with the parameter value PT of $(\alpha+p)$.

The coefficient $\alpha$ is the total sum $\Sigma$ of the values of the neighboring pixels PX00 to PX04, PX10 to PX14, PX20, PX21, PX23, PX24, PX30 to PX34, and PX40 to PX44.

p indicates a variable additament to be added to the coefficient $\alpha$ and is set to a positive integer from 1 to 20, for example.

In the example shown in FIG. 6, "−1" is set to the neighboring pixels PX00 to PX04, PX10, PX20, PX30, PX14, PX24, PX34, PX40 to PX44.

Also, "−2" is set to eight neighboring pixels PX11, PX12, PX13, PX21, PX23, PX31, PX32, and PX33 adjacent to the target pixel TPX (PX22).

Therefore, in the example shown in FIG. 6, the coefficient a of the target pixel TPX is 32.

The Laplacian filter functions to sharpen the periphery of the target pixel TPX as shown in FIG. 6(B).

Upon receiving a signal S211 supplied from the parameter setting section 212, the Laplacian filtering section 211 implements a Laplacian filtering on the scanned multi-valued image data in the sample area SMPL by using the Laplacian filter with the parameter values PT in which the variable additament p is changed, and produces the compensated (multi-valued) image data corresponding to the parameter values PT.

The Laplacian filtering section 211 outputs the compensated image data corresponding to the parameter values PT as a signal S211 to the binarization processing section 213.

Upon receiving a signal S212R supplied from the parameter setting section 212, the Laplacian filtering section 211 judges that it has received the optimal parameter value PT, and implements the Laplacian filtering on the entire scanned multi-valued image data using the Laplacian filter in which this parameter value PT is set, to produce the compensated image data corresponding to this parameter value PT.

The Laplacian filtering section 211 outputs the compensated image data corresponding to this parameter value PT as a signal S211R to the binarization processing section 213.

The parameter setting section 212 sets the parameter values PT which are calculated by successively changing the variable additament P that is a component to form the parameter PT to be applied to the above mentioned Laplacian filtering, gives numbers to the parameter values PT and outputs them as a signal S212 to the Laplacian filtering section 211.

Also, the parameter setting section 212 outputs the parameter value, which has been notified as the optimal parameter value PT by the optimal binarization data selecting unit 23, as a signal S212R to the Laplacian filtering section 211 again.

Upon receiving the signal S211 from the Laplacian filtering section 211, the binarization processing section 213 binarizes each of the compensated image data of the sample area SMPL, which has received the Laplacian filtering successively changing the parameter values, based on the predetermined binary threshold values and outputs each binary compensated image data after binarization as a signal S213R to the correlation operation unit 22.

Upon receiving the signal S211R from the Laplacian filtering process section, the binarization processing section 213 binarizes the compensated image data acquired after the entire scanned multi-valued image data has received the Laplacian filtering process with the optimal parameter value, and outputs the entire compensated data which is binarized, as a signal S213 to the image display unit 18 and the image recognition unit 19.

In the previous description, the binary threshold value is a fixed value; however, the binary threshold value can be configured to be acquired by a discriminant analysis method.

The discriminant analysis method is, when dividing the sum of the gray values by the threshold value t into two classes in the histogram of an image of gray levels, to acquire t as the threshold value with which the variance within the class is minimum and the variance between the classes is also minimum.

Upon receiving the signal S213 from the binarization processing section 213, the correlation operation section 22 acquires the correlation coefficients R between the binary compensated image data of the sample area SMPL and the image data of the sample area SMPL in the original image OIM(X).

The correlation operation section 22 outputs the acquired correlation coefficient R as well as the number data of the parameter values used in the filtering process, as a signal S22 to the optimal binary data selection section 23.

Upon receiving the signal S22 from the correlation operation section 22, the optimal binary data selecting unit 23 compares the correlation coefficients with each other, judges the image on which the filtering process and the binarization process are implemented using the parameter value PT with the maximum correlation coefficient R, more specifically the variable additament p that produces this parameter value PT, as the optimal binary image data, and notifies the parameter setting section 212 of the information (such as the number) of the optimal parameter value PT as a signal S23 so that the optimal binary image data is produced based on this parameter value PT.

Thus, the optimal binarization information selecting unit 23 in the first embodiment functions as the optimal parameter information selecting unit.

Next, the correlation between the original image and the binary image is further described.

Figure 7:
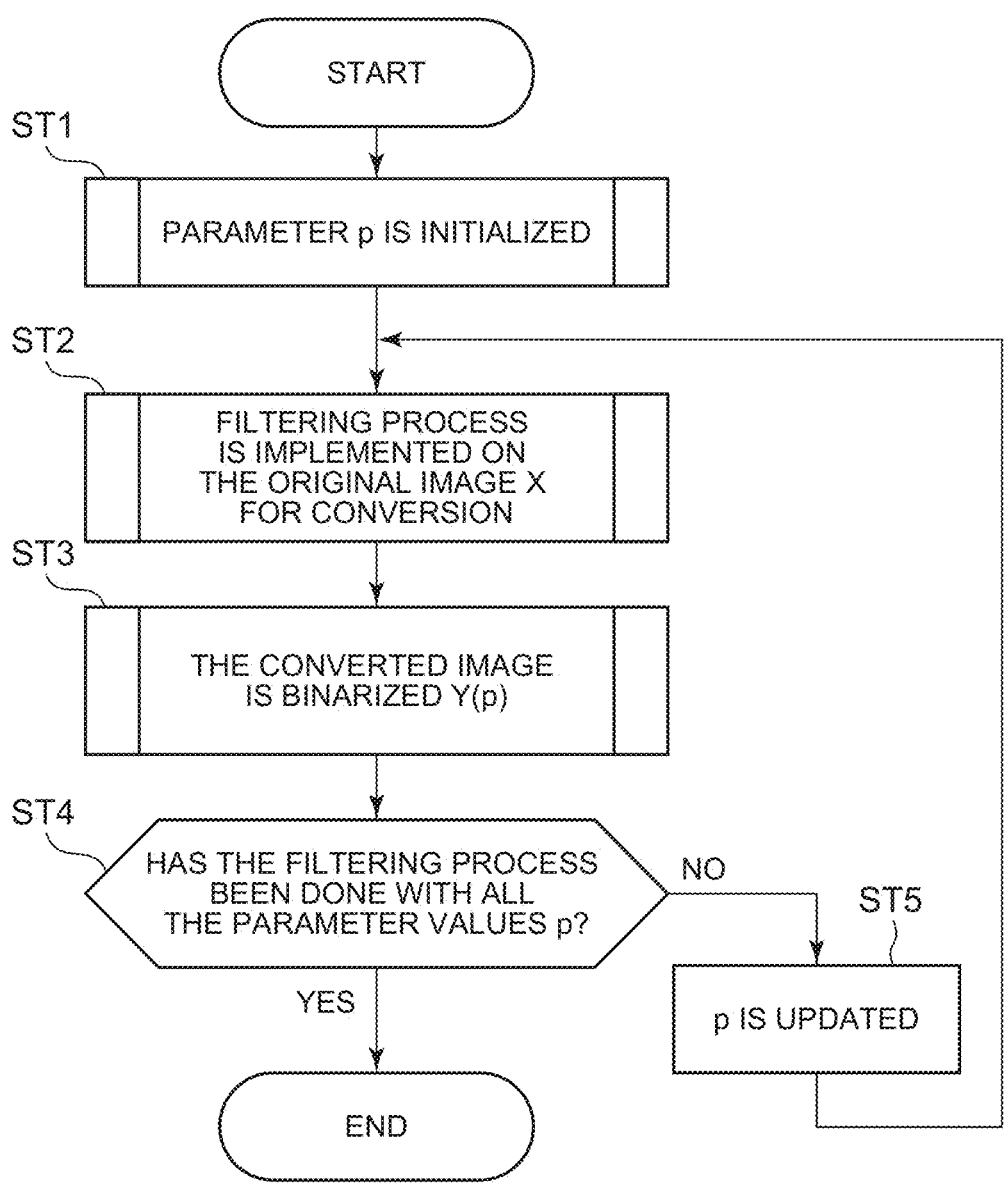
FIG. 7 is a flowchart to explain the binarization process of this embodiment.

FIG. 7 is a flowchart of the outline of the binarization process of this embodiment. In the binarization process of this embodiment, a filter with a parameter is used. One binary image corresponds to one parameter value.

The filtering process and the fixed threshold binarization process, which together configure the binarization process, may use the technique that is disclosed in the non-patent reference 1, for example.

In this embodiment, a binary image changes according to the parameter value PT of the filter, the variable additament p, more specifically, that is a component forming the parameter value PT, as described above.

By changing the parameter value PT (p) in order after initialization (Step ST1), implementing a filtering process on the original image X (of the sample area in the embodiment) and converting it (Step ST2), and implementing a binarization process on the image after the conversion, a binary image Y(p) is acquired one after another (Step ST3).

By implementing this process with every variable additament p (Steps ST4 and ST5), multiple binary images which change according to the variable additament p are acquired.

In this embodiment, the binary image which is the most similar to the original image X is adopted.

As described above, the correlation coefficient can be used to measure the similarity. The correlation coefficients are calculated as in the formula below with respect to the pixel values between the binary image and the original image.

$X_i$ indicates the element of the original image, and $Y_i$ indicates the element of the binary image. $_i$ expresses the index of the element, and most of the time, the upper left corner of the image is $_i=1$ and the lower right corner is $_i=n$. When the image is on the p row×q column, n=p*q. The element means the pixel value, more specifically described.

$$R = \frac{\sum_{i=1}^{n}(X_i - \overline{X})(Y_i - \overline{Y})}{\sqrt{\sum_{i=1}^{n}(X_i - \overline{X})^2}\sqrt{\sum_{i=1}^{n}(Y_i - \overline{Y})^2}}$$

[Formula 1]

If the binary image with the maximum correlation coefficient R (may be indicated by r) is selected, that is the optimal solution.

However, in the formula in the non-patent reference 1, the correlation operation to acquire the optimal binary image is implemented over the entire image; therefore, when the actual installation has a restriction in the CPU operation ability and/or the memory capacity, the operation cost may increase.

On the other hand, in this embodiment, the correlation operation to acquire the optimal binary image is implemented by focusing on the sample area (the target area) which is designated in advance.

As a result, less time is required for the operation; also, since the correlation operation is implemented using the image of the sample area, the binary image sample area having the characteristics that are most similar to the original image can be selected. For this reason, the result suits the purpose better.

Figure 8:
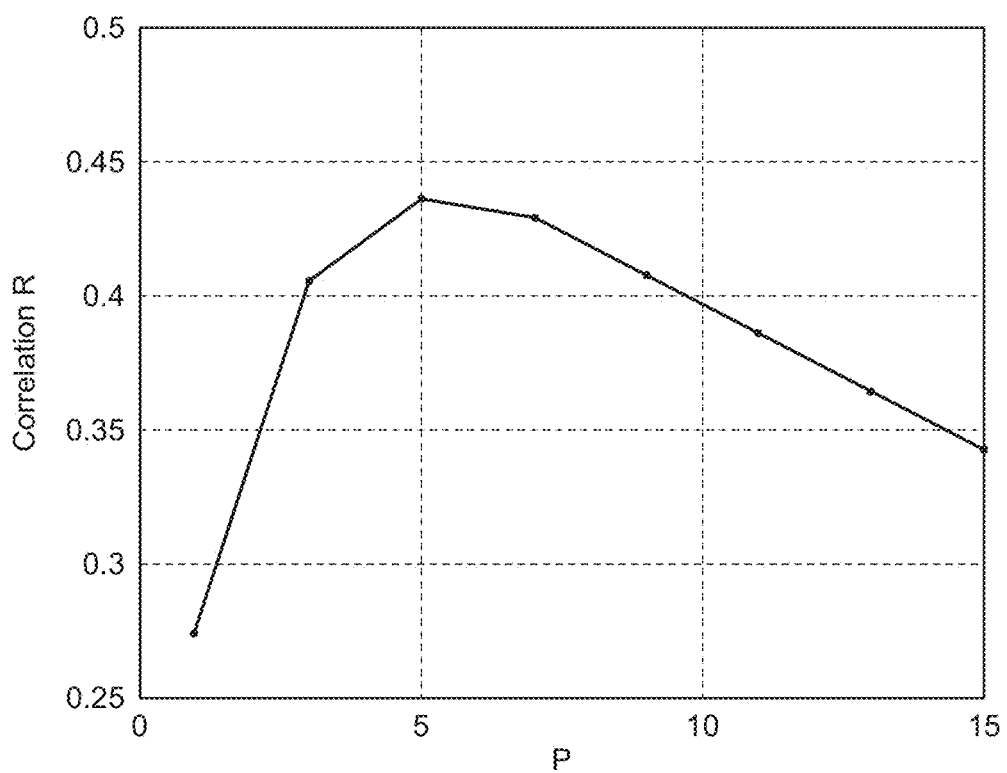
FIG. 8 is a diagram showing the relationship between the variable additament p of the parameter and the correlation coefficient between the original image and the binary image.

FIG. 8 shows the relationship between the variable additaments p of the parameter and the correlation coefficients R between the original image and the binary image.

In FIG. 8, the horizontal axis indicates the variable additament p of the parameter and the vertical axis indicates the correlation coefficient R.

In the example shown in FIG. 8, the maximum correlation coefficient R is observed when the variable additament p is 5. Accordingly, in this case, the image acquired through the filtering process and the binarization process with the parameter value PT (α+p) in which the variable additament p is 5, is selected as the binary image having the characteristics that are similar to the original image.

Figure 9:
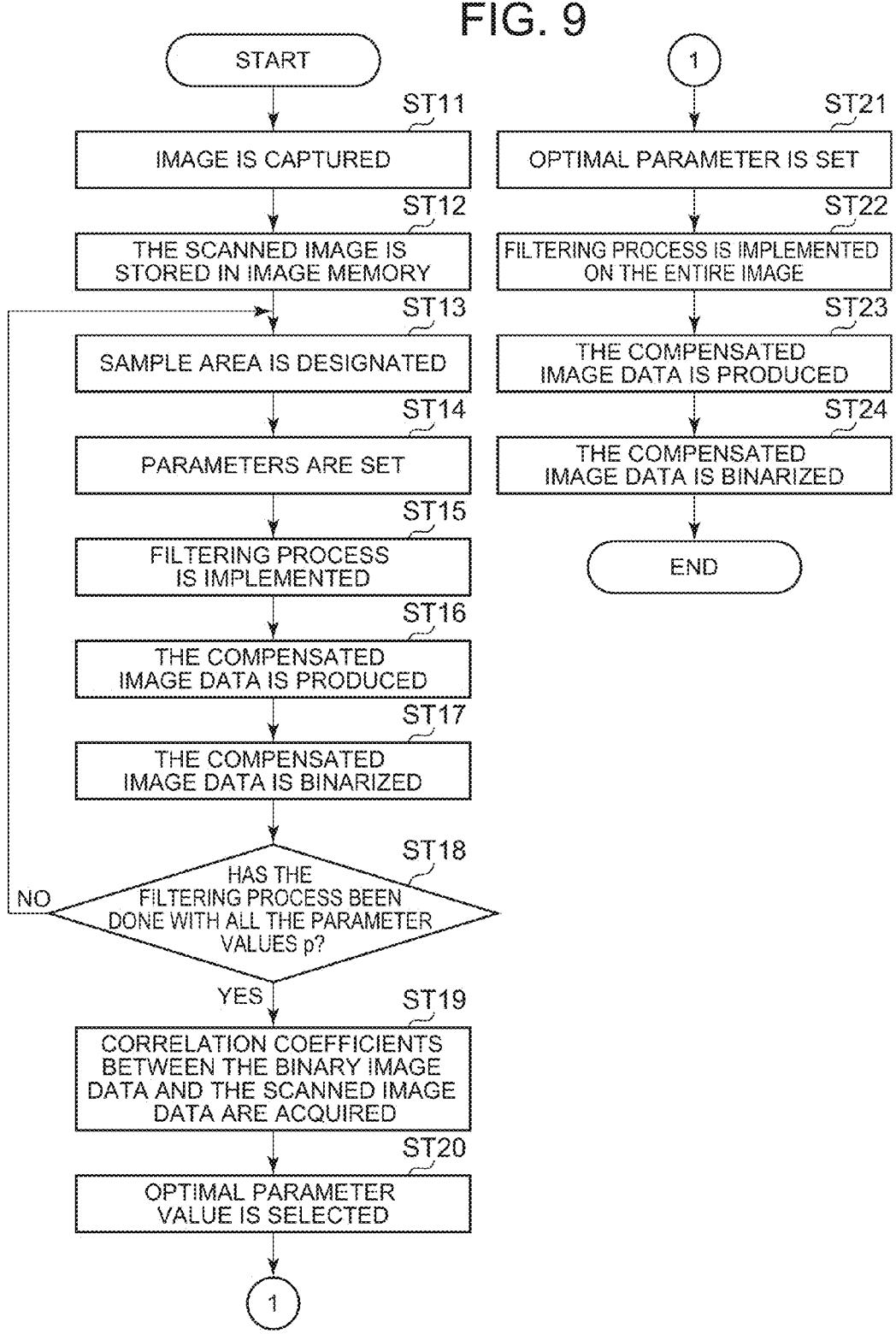
FIG. 9 is a flowchart to explain the operation of the image processing device of the first embodiment.

Next, the operation of the image processing device 10 of the first embodiment is described associating with FIG. 9.

FIG. 9 is a flowchart to explain the operation of the image processing device 10 of the first embodiment.

As a check CHK, which is a medium to be scanned, is inserted to the medium transporting unit 12 and transported to pass the sensor head of the image sensor 11, the image thereof is scanned (Step ST11), and its digitized scanned multi-valued image (the gray image) is stored in the image memory 16 (Step ST12).

Next, at the sample area designating unit 20 of the image processing unit 17, a sample area SMPL on which the image processing including the Laplacian filtering process is selectively implemented as a sample is designated in the original image (scanned multi-valued gray image) OIM(X) stored in the image memory (Step ST13).

Next, in the binarization section 21, the filtering process and the binarization process, which are described below, are implemented on the designated sample area.

First, in the parameter setting section 212, the parameter values PT calculated by successively changing the variable addittament p that is a component forming the parameter value PT are set to be used in the Laplacian filtering process (Step ST14). The numbers are given to the parameter values PT, for example, and output as a signal S212 to the Laplacian filtering process section 211.

In the Laplacian filtering process section 211, responding to the signal S212 supplied from the parameter setting section 212, the Laplacian filtering is implemented on the scanned multi-valued image data in the sample area SMPL, using the Laplacian filter with the parameter values PT calculated by [successively] changing the variable addititament p (Step ST15).

Through this, the compensated image data corresponding to the parameter values PT is produced (Step ST16).

The compensated image data corresponding to the parameter values PT is output as a signal S211 to the binarization processing section 213.

In the binarization processing section 213, responding to the signal S211 from the Laplacian filtering process section 211, each compensated image data in the sample area SMPL, on which the Laplacian filtering process has been implemented while the parameter values are changed successively, is binarized based on the predetermined binary threshold(s) (Step ST17).

Each of the compensated image data after binarization is output as a signal S213 to the correlation operation section 22.

At this point, it is judged whether or not the filtering process and the binarization process have been implemented with all the parameter values PT of the filter, that is with all of the variable additaments p, more specifically described (Step ST18).

If it is judged that not all are finished, the process moves to the step ST14 in which the variable addittament p of the parameter value is updated at the parameter setting section 212, and the process from the step ST14 to the step ST17 is repeated until the filtering process and the binarization process are implemented with all the parameter values PT (the variable additaments p).

Next, at the correlation operation section 22, responding to the signal S213 from the binarization process section 213, the correlation coefficients R between the binary image data of the sample area SMPL and the image data of the sample area SMPL of the original image OIM(X) are acquired (Step ST19).

The acquired correlation coefficients R are output to the optimal binarization information selecting unit 23 as a signal S22 containing the number information of the parameter values used in the filtering process.

At the optimal binarization information selecting unit 23, upon receiving the signal S22 from the correlation operation unit 22, the correlation coefficients are compared with each other, and the parameter value PT with the largest correlation coefficient R is selected (Step ST20).

More specifically described, at the optimal binarization information selecting unit 23, the image on which the filtering process and the binarization process are implemented using the variable additament p that is a component forming the parameter value PT is judged as the optimal binary image data.

Then, the information of the optimal parameter value PT (such as the number) is notified as a signal S23 to the parameter setting section 212 so that the optimal binary image data is produced based on it.

At this point, at the binarization unit 21, the filtering process and the binarization process are implemented on the entire original image OIM(X), using the parameter value PT which has been judged optimal for binarization and therefore selected.

In other words, at the parameter setting section 212, the parameter value notified as the optimal parameter value PT from the optimal binarization information selection section 23 is output as a signal S212R to the Laplacian filtering process section 211 again (Step ST21).

Next, upon receiving the signal S212R from the parameter setting section 212, the Laplacian filtering process section judges that it has received the optimal parameter value PT.

Then, at the Laplacian filtering process section 211, the Laplaican filtering is implemented on the entire scanned multi-valued image data of the original image OIM(X), using the Laplacian filter in which this parameter value PT is set (Step ST22).

Through this, the compensated (multi-valued) image data of the entire original image OIM(X) corresponding to the parameter value PT is produced (Step ST23).

The compensated image data corresponding to the optimal parameter value PT is output as a signal S2113 to the binarization process section 213.

At the binarization process section 213, responding to the signal S211R from the Laplacian filtering process section 211, the compensated image data of the entire original image OIM(X) on which the Laplacian filtering process has been implemented changing the parameter values in sequence is binarized based on the predetermined binary threshold(s) (Step ST24).

Then, the entire image data after the binarization is output as a signal S213R to the image display unit 18 and the image recognition unit 19.

As described above, according to the first embodiment, the following effects can be obtained.

In the first embodiment, a sample area is designated in the original image and a correlation coefficient operation is implemented not on the entire image but only on the target sample area.

By doing so, the calculation can be done in a short time, and by focusing the correlation operation on the sample area that is targeted in advance, the binary image optimal for that area can be acquired.

For example, when a particular character area is present on the medium, this [particular] area can be designated as a target sample area so that the binary image representing the sample area best can be acquired.

Therefore, according to this embodiment, the operation time and the memory capacity required are less; and also since the correlation operation is implemented using the image of the target sample area, the binary image target sample area having the characteristics that are most similar to [the image of] the original image, is selected, thus resulting in satisfying the purpose.

Also, in this embodiment, the optimal parameter value is selected based on the correlation coefficient operation result, and the filtering process and the binarization process are implemented using this optimal parameter value; therefore, not only the binary image representing the sample area best can be acquired, but also the high quality binary image in a superior accurate reproduction can be acquired with relatively less operation workload than the original image [may require].

Figure 10:
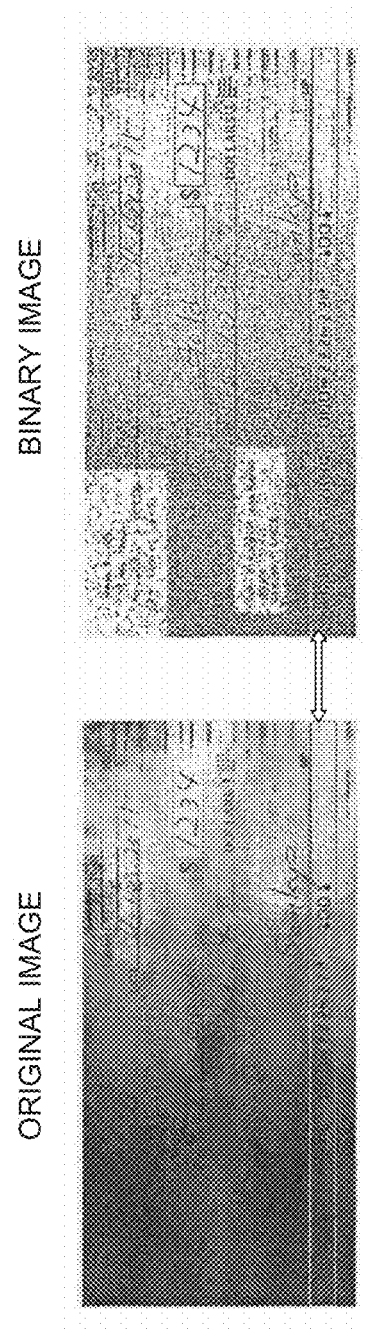
FIGS. 10A and 10B are diagrams showing an example of the original image and the binary image processed by the image processing device of this embodiment.

FIG. 10(A) and (B) show one example of the original image and its binary image processed by the image processing device of this embodiment.

FIG. 10(A) shows the original image and FIG. 10(B) shows its binary image.

In the same manner as the description that was made associated with FIG. 3, most of the background BGD in the original image OIM(X), the left side of the check CHK in the figure in particular in which the writing area of memo line FAR5 is arranged, is very dark, making it difficult to identify the characters due to the imaging condition such as the intensity of illumination and the direction of illumination.

In the original image OIM(X) shown in FIG. 10(A), the writing area of payee FAR2, the writing area of settlement amount FAR4, and the writing area of signature FAR6, located in the middle section of the check CHK, is somewhat readable, but still dark which makes it difficult to read.

On the other hand, in the binary image of this embodiment shown in FIG. 10(B), the writing area of payee FAR2, the writing area of settlement amount FAR4, the writing area of memo line FAR5, and the writing area of signature FAR6, located in the middle section of the check CHK, are binarized in a high reproduction quality in which the characters are readable without difficulties.

Not to mention that the writing area of date FAR1 and the writing area of amount FAR3, arranged toward the right side of the check CHK in the figure, are binarized in a relatively clear reproduction quality. In particular, the writing area of amount FAR3 in the target area (the sample area) in this embodiment is binarized in a high reproduction quality in which the characters can be identified easily.

In the above manner, according to this embodiment, not only the area in the original image in which the characters are readable, but also the very dark area in which the characters are harder to identify, can be optimally binarized in a high reproduction quality in which the characters can easily be identified.

The medium to be scanned is not limited to a check; an area of a photo in a picture ID card, a driver's license or a passport may be designated as a target sample area to acquire an optimal binary image suitable for the photo.

When the target sample area does not change depending on the medium, the area may be fixed; when the sample area changes depending on the medium, a mechanism may be provided to automatically judge the area.

For an example of a driver's license, a potential target area is the area in which the license number is printed or the area of a photo.

Thus, the image processing device 10 of this embodiment can be used not only with checks but also with various media such as a passport or a driver's license.

<Second Embodiment>

Next, an example of the configuration of an image processing unit 17A of the second embodiment is described.

Figure 11:
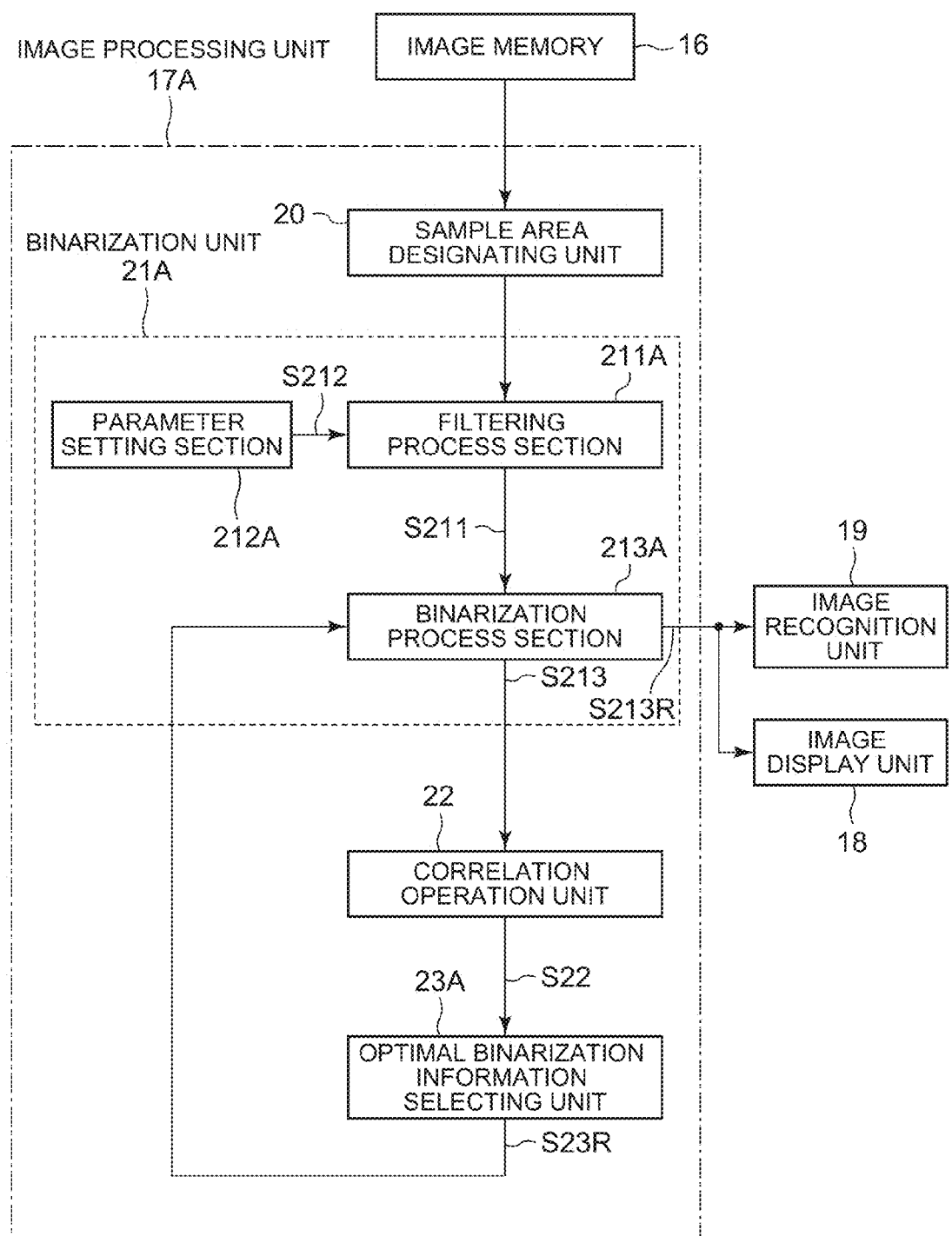
FIG. 11 is a block diagram showing an example of the configuration of an image processing unit of the second embodiment.

FIG. 11 is a block diagram to explain an example of the configuration of the image processing section of the second embodiment.

FIG. 12 is a flowchart to explain the operation of the image processing device of the second embodiment.

The image processing unit 17A of the second embodiment differs from the image processing unit 17 of the first embodiment in the following:

In the image processing unit 17 of the first embodiment, the filtering process and the binarization process are implemented only on the designated sample area SMPL so that the correlation coefficient operation is implemented only on this sample area.

On the other hand, in the image processing unit 17A of the second embodiment, the filtering process and the binarization process are implemented not only on the designated sample area SMPL but also on the entire original image including the sample area SMPL (Steps ST15, ST16 and ST17 in FIG. 12), but the correlation coefficient operation is implemented only on the sample area.

In the image processing unit 17A, the optimal binary image is selected by an optimal binary information selecting unit 23A, based on the result of the correlation operation at the correlation operation unit 22.

Then, the information that notifies the optimal binary image is output as a signal S23R to the binary processing section 213, and accompanying this, the optimal binary image is selected from the multiple binary images stored in the memory and output as a signal S213R to the image display unit 18 and the image recognition unit 19.

According to the second embodiment, although the memory capacity needs to be increased for temporarily storing the binary images that correspond to the parameter values, almost the same effects as the above described first embodiment can be obtained.

As described above, although the first and the second embodiments differ from each other in the memory capacity, the calculation time can be shortened and the correlation operation is implemented focusing on the target sample area that is designated in advance to acquire the binary image optimal to the area in both embodiments.

For example, when there is a specific character area on the medium, this area can be designated as a target sample area so that the binary image representing this sample area best can be acquired.

Therefore, according to the first and the second embodiments, the operation time and the memory capacity required are less; since the correlation operation is implemented using the image of the target sample area, the binary image target sample area having the characteristics that are most similar to the original image is selected, obtaining the result satisfying the purpose.

In the first and the second embodiments, the optimal parameter value is selected from the correlation coefficient operation result, and the filtering process and the binarization process are implemented using this optimal parameter; therefore, not only the binary image representing the sample area best can be acquired, but also a high quality binary image of a very high reproduction quality can be acquired for the entire image through relatively less operation workload than the original image [may require].

Shown next is an example of the binary image obtained when a check CHK, which is the medium to be scanned, is scanned by the image processing device 10, 10A of this embodiment and the sample area designating, the filtering process and the binarization process, which are the features of the above described embodiments, are implemented.

FIG. 13(A) to (I) and FIG. 14(A) to (I) show the binary images obtained when the check shown in FIG. 2 is scanned and the sample area designation, the filtering process and the binarization process, which are the feature of this invention, are implemented.

FIG. 13(A) and FIG. 14(A) show the scanned original images OIM(X), and the other binary images are shown with the information of the variable additaments p and their corresponding correlation coefficients r(R).

Figure 15:
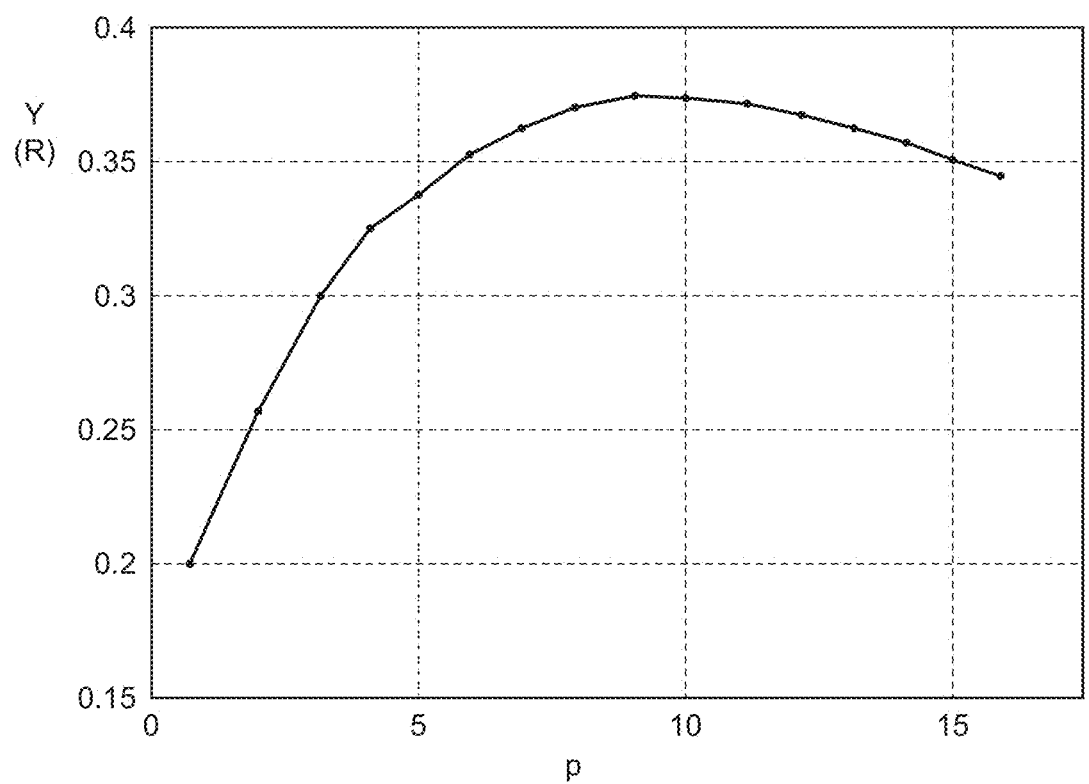
FIG. 15 is a graph showing the relationship between the variable additaments of the binary images in FIG. 13 and FIG. 14 and the correlation coefficients r(R).

Also, FIG. 15 shows the relationship between the variable additaments p and the correlation coefficients r(R) of the binary images shown in FIG. 13 and FIG. 14.

In this example, the binary image shown by FIG. 14(B) is selected as the optimal binary image since this binary image corresponding to the parameter value acquired when the variable additament p is "9" has the largest correlation coefficient r(R) of "0.373407".

Note that it is understood from FIG. 13 and FIG. 14 that even if the binary image does not have the largest correlation coefficient r or even if the binary image corresponding to the variable additament p of 5 or larger has a dark area which makes it difficult to read/identify characters in the original image, it can be binarized to be readable without problems in a high reproduction quality.

Also, the binary image corresponding to the variable additament p (10 to 16 in this example) larger than the variable additament p (9 in this example) which can form the binary image corresponding to the largest correlation coefficient r is poor in the sharpness of the reproduced characters; however, the overall brightness of the check can be increased. In other words, the binary image of the check acquired through the above mentioned filtering process and the binarization process may have a background color close to white.

Therefore, the binary image obtained when the sample area designation, the filtering process and the binarization process, which are the features of this embodiment, is the one in which not only the area in the original image in which the characters are readable, but also the very dark area in which the characters are harder to identify are optimally binarized to be readable without problems in a high reproduction quality.

<Third Embodiment>

Next, an example of the configuration of an image processing unit 17B of the third embodiment is described.

Figure 16:
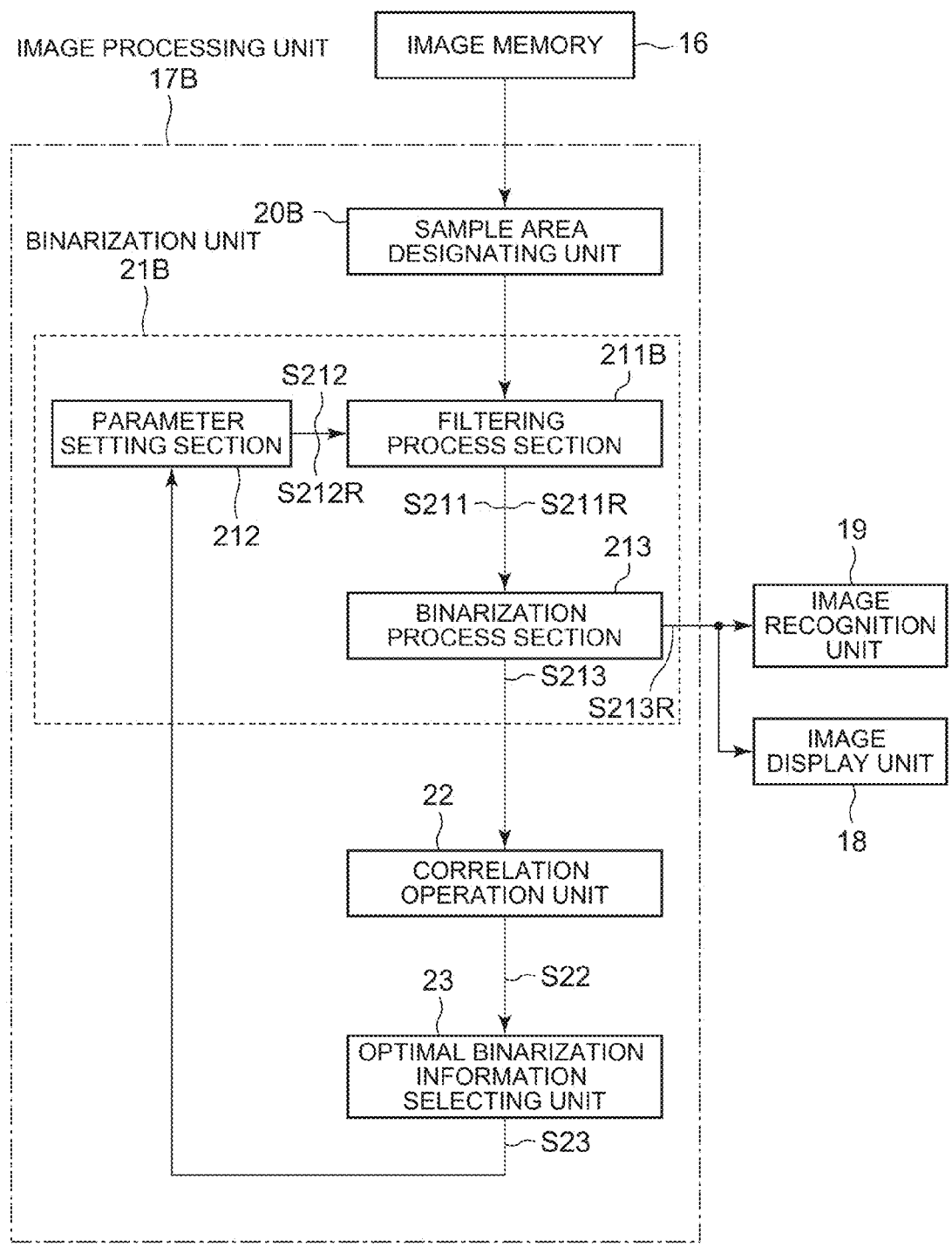
FIG. 16 is a block diagram showing an example of the configuration of an image processing unit of the third embodiment.

FIG. 16 is a block diagram showing a configuration example of the image processing device of the third embodiment.

Figure 17:
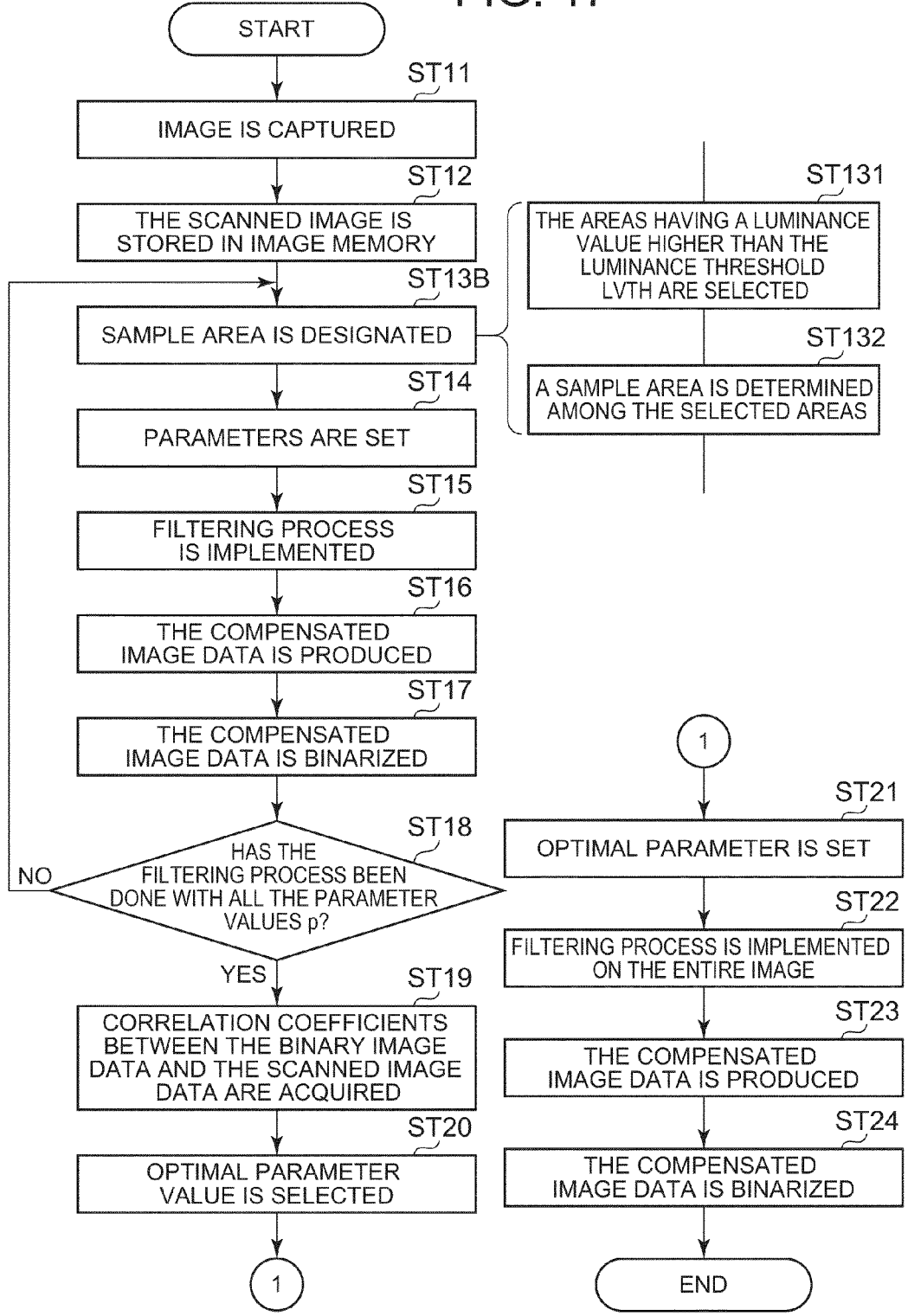
FIG. 17 is a flowchart to explain the operation of the image processing dev ice of the third embodiment.

FIG. 17 is a flowchart to explain the operation of the image processing device of the third embodiment.

The image processing unit 17B of the third embodiment differs from the image processing unit 17 of the first embodiment in the following:

In the image processing unit 17 of the first embodiment, the sample area designating unit 20 selects a specific area of the check CHK, more specifically the writing area of amount FAR3 in which presumably the pixels with the highest luminance are most present in the scanned image.

Figure 18:
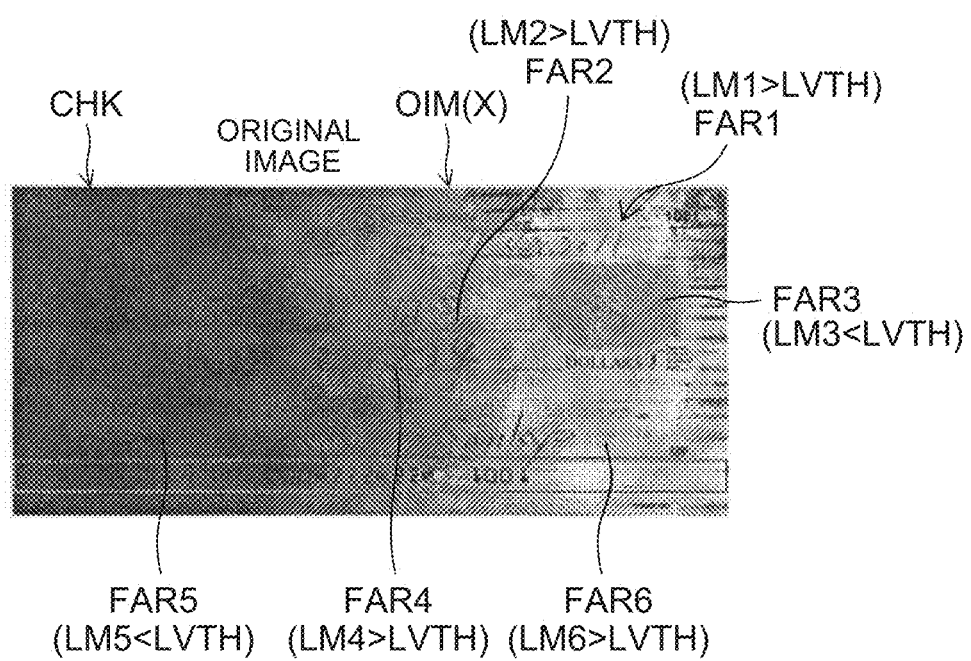
FIG. 18 is a diagram to explain the method of this embodiment for designating a sample area, described in the third embodiment.

This method is considered to not present any problems when the writing area FAR3 is captured with high luminance with certainty; however, as shown in FIG. 18, if the writing area FAR3 is captured very dark due to the scanning condition and therefore, the characters are harder to identify, the accuracy of the correlation operation may be affected. Also, it is difficult to use this method for various media to be scanned.

Then, in a sample area designating unit 20B of the third embodiment, as shown in Step ST13 in FIG. 17, the area having the pixel value, the luminance value more specifically, higher than the threshold value LVTH in the entire original image OIM(X) is determined as a sample area.

FIG. 18 is a diagram to explain a sample area setting method of third embodiment.

As one of the examples, the candidates for setting a sample area are the areas in which characters will be written, such as the writing area of date FAR1, the writing area of payee FAR2, the writing area of amount FAR3, the writing area of settlement amount FAR4, the writing area of memo line FAR5 and the writing area of signature FAR6.

Then, the sample area designating unit 20B checks the luminance values LM1 through LM6 of the writing areas FAR1 through FAR6 respectively to judge whether or not each luminance value is higher than the threshold value LVTH. When any area has a luminance value lower than the threshold level LVTH, it is eliminated from the sample area candidacy. In the example of FIG. 18, the writing areas FAR3 and FAR5 are eliminated.

Then, the sample area designating unit 23B designates, among the remaining areas, the writing area having the highest luminance value, which is the writing area FAR1 in the example of FIG. 18, as a sample area.

Through this, the sample area can be set with certainty without affecting the accuracy of the correlation operation.

Note that it is not always necessary that the area having the highest luminance value be selected as a candidate, but the area having the second or third highest luminance value may be designated as a sample area.

This provides an advantage that a sample area can be set according to the type of medium to be scanned.

In the above example, the method is to take multiple writing areas as candidates for a sample area; however, the present invention is not limited to this, but a method may be to divide the entire original image by the luminance threshold levels and designate a certain area from the areas selected as having the higher luminance values as a sample area.

In addition to the effects of the above-mentioned first embodiment, the third embodiment can be used for various media to be scanned, in which the optimal binarization process can be surely implemented without affecting the accuracy of the correlation operation.

<Fourth Embodiment>

Next, the configuration example of an image processing unit 17C of the fourth embodiment is described.

Figure 19:
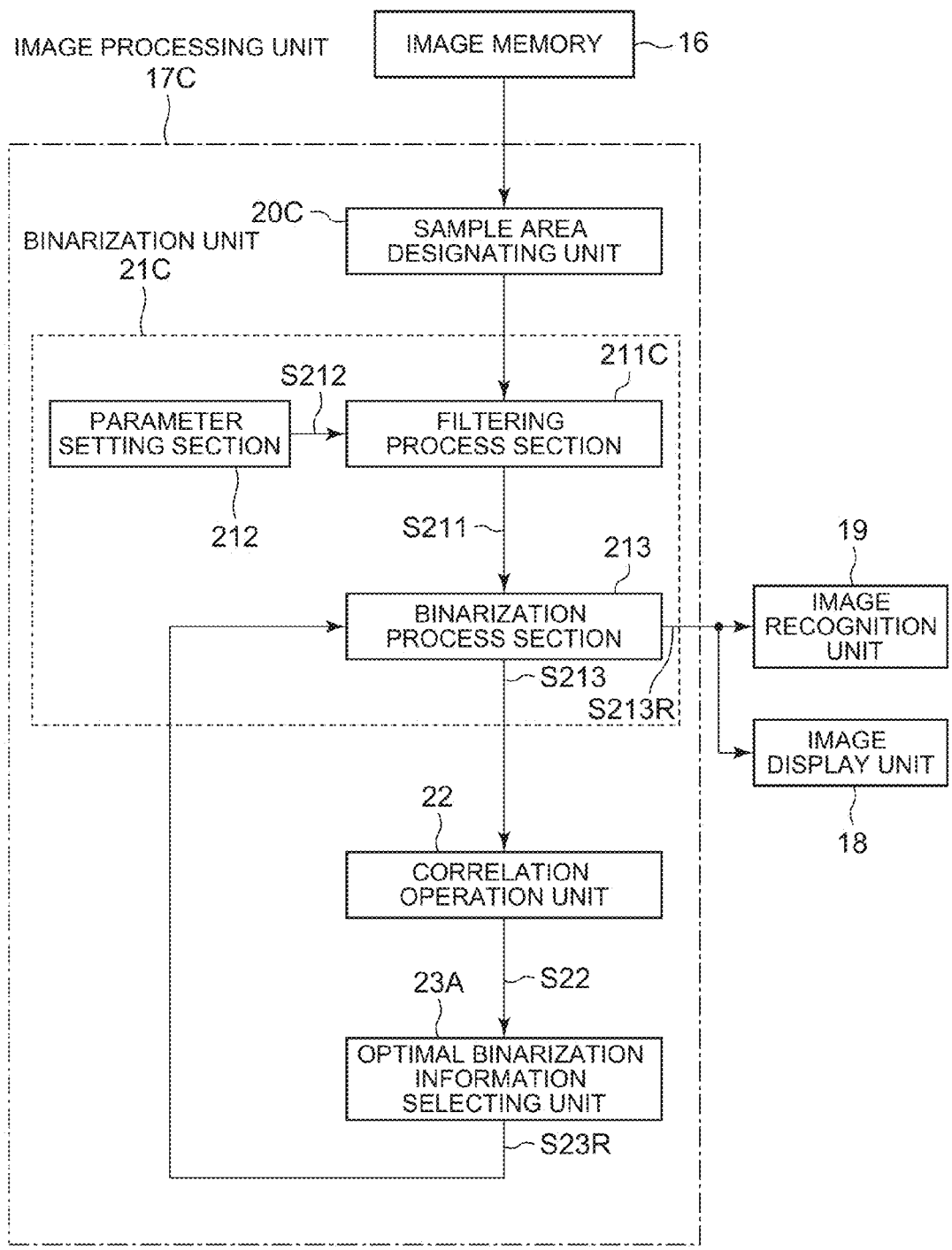
FIG. 19 is a block diagram showing an example of the configuration of an image processing unit of the fourth embodiment.

FIG. 19 is a block diagram of the configuration example of the image processing section of the fourth embodiment.

FIG. 20 is a flowchart to explain the operation of the image processing device of the fourth embodiment.

The image processing unit 17C of the fourth embodiment is configured, based on the configuration of the image processing unit 17A of the second embodiment, to determine (designate) the area in the entire original image OIM(X) having the pixel values, the luminance value more specifically, higher than the threshold level LVTH, which is set in advance, as a sample area at the sample area designating unit 20C in the same manner as the sample area designating unit 20B of the above-described third embodiment (Step ST13C in FIG. 20).

The basic configuration and function of the sample area designating unit 20C is the same as the sample area designating unit 20B of the above-described third embodiment; therefore, its detailed description is omitted.

In addition to the effects of the above-described second embodiment, the fourth embodiment can be used for various media to be scanned, in which the optimal binarization process can surely be implemented without affecting the accuracy of the correlation operation.

Note that the above-described methods can be configured as programs according to the above-described steps and executed by a computer such as a CPU.

Also, such a program is not be limited to being built in a ROM in a computer, but also may be stored in a recording medium such as a semiconductor memory, a magnetic disk, an optical disk, or a floppy disk (registered trademark). In such a case, the program may be accessed through the computer that has the recording medium set therein to execute the program.

What is claimed is:

1. An image processing device for producing a binary image from a scanned multi-valued gray image, comprising:
    an image scanning unit for scanning an image as said multi-valued image;
    an image memory for storing said multi-valued image captured by said image scanning unit;
    a sample area designating unit for designating a sample area in said scanned multi-valued image stored in said image memory;
    a binarization unit for implementing a filtering process on said scanned multi-valued image over which said sample area is designated, to produce compensated image data and for binarizing said compensated image data;
    a correlation operation unit for acquiring each of the correlations between the binary image data acquired at said binarization unit and said scanned multi-valued image data; and
    an optimal binarization information selecting unit for selecting the optimal parameter value or binary image data based on said correlations;
    wherein said binarization unit includes
    a parameter value setting section for setting multiple parameter values which are calculated by adding the variable additaments to the coefficient for a target pixel in a filter,
    a filtering process section for creating a matrix that contains said target pixel in the center and its neighboring pixels and for implementing a filtering process on said scanned multi-valued image data using said filter for which said parameter values are set, to produce the compensated image data corresponding to said parameter values, and
    a binarization process section for binarizing each of said compensated image data based on a predetermined binary threshold.

2. The image processing device of claim 1 wherein said filtering process section of said binarization unit implements a filtering process on said scanned multi-valued image data in said sample area to produce the compensated image data corresponding to said parameter values.

3. The image processing device of claim 2 wherein said optimal binarization information selecting section selects the optimal parameter value based on said correlations and notifies it to said parameter setting section;
    said filtering process section of said binarization unit implements a filtering process on the entire scanned multi-valued image using said notified parameter value to produce the compensated image data corresponding to said optimal parameter value; and
    said binariazation unit binarizes said entire compensated image data based on a predetermined binary threshold.

4. The image processing device of claim 1 wherein said filtering process section of said binarization unit implements a filtering process on the entire scanned multi-valued image data that includes said sample area to produce the compensated image data corresponding to said parameter values.

5. The image processing device of claim 4 wherein said optimal binarization information selecting section selects the optimal binary image data based on said correlations and notifies it to said binarization process section of said binarization unit; and
    said binarization process section of said binarization unit binarizes said entire compensated image data based on a predetermined binary threshold and outputs it as a binary image.

6. The image processing device as set forth in claim 1 wherein said sample area designating unit compares the luminance value, which the pixel value of the scanned multi-valued image stored in said image memory indicates, with the luminance threshold that is set in advance.

7. The image processing device as set forth claim 6 wherein:
    a medium to be scanned by said image scanning unit contains multiple writing areas;
    said sample area designating unit selects the writing areas having the luminance value higher than said luminance threshold from said multiple writing areas, and designates a sample area from said selected writing areas.

8. An image processing method for producing a binary image from a read multi-valued gray image, comprising:
    an image scanning step in which an image is captured as said multi-valued image;
    an image storing step in which said multi-valued image captured in said image scanning step is stored in an image memory;
    a sample area designating step in which a sample area is designated in said scanned multi-valued image stored in said image memory;
    a binarization step in which a filtering process is implemented on said scanned multi-valued image over which said sample area is designated, to produce compensated image data and said compensated image data is binarized;
    a correlation operation step in which each of the correlations between the binary image data obtained in said binarization step and said scanned multi-valued image data is acquired; and
    an optimal binarization information selecting step in which the optimal parameter value or binary image data is selected based on said correlations;
    wherein said binarization step includes
    a parameter value setting step for setting multiple parameter values which are calculated by adding the variable additaments to the coefficient for a target pixel in a filter,
    a filtering process step for creating a matrix that contains said target pixel in the center and its neighboring pixels and for implementing a filtering process on said scanned multi-valued image data using said filter having said parameter values which have been set, to produce the compensated image data corresponding to said parameter values, and
    a binarization process step for binarizing each of said compensated image data based on a predetermined binary threshold.

* * * * *